(12) United States Patent
Miyazawa et al.

(10) Patent No.: US 6,815,033 B2
(45) Date of Patent: Nov. 9, 2004

(54) COMPOUND, OPTICAL RECORDING MEDIUM AND OPTICAL RECORDING METHOD

(75) Inventors: Takashi Miyazawa, Kanagawa (JP); Shuichi Maeda, Kanagawa (JP); Yasuhiro Kameyama, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 117 days.

(21) Appl. No.: 10/310,763

(22) Filed: Dec. 6, 2002

(65) Prior Publication Data

US 2003/0175468 A1 Sep. 18, 2003

(30) Foreign Application Priority Data

Dec. 6, 2001 (JP) ........................................ 2001-372199

(51) Int. Cl.[7] .................................................. B32B 3/02
(52) U.S. Cl. .................... 428/64.1; 428/64.4; 428/64.8; 430/270.14; 430/270.15
(58) Field of Search .............................. 428/64.1, 64.4, 428/64.8, 913; 430/270.14, 270.15

(56) References Cited

U.S. PATENT DOCUMENTS

| | | | | |
|---|---|---|---|---|
| 4,514,481 A | * | 4/1985 | Scozzafava et al. | 430/58.15 |
| 4,598,033 A | * | 7/1986 | Kawamura et al. | 430/75 |
| 4,668,803 A | * | 5/1987 | Berman et al. | 549/291 |
| 2003/0134148 A1 | * | 7/2003 | Okada et al. | 428/690 |

FOREIGN PATENT DOCUMENTS

| | | |
|---|---|---|
| EP | 0 791 849 | 8/1997 |
| EP | 1 091 355 | 4/2001 |
| JP | 61-109048 | 5/1986 |
| JP | 6-337492 | 12/1994 |
| JP | 7-142169 | 6/1995 |
| JP | 11-191489 | 7/1999 |
| JP | 2001-071639 | 3/2001 |
| JP | 2001-102174 | 4/2001 |

OTHER PUBLICATIONS

F. Eiden, et al., Archiv der Pharmazie, vol. 297, No. 1, pp. 1–9, "Reaktionen Mit Chelidonsaüre. II", Jan. 1964.

I. Belsky, et al., J. Org. Chem., vol. 39, No. 7, pp. 989–995, "The Synthesis and Properties of Heterofulvenes, Derivatives of 2,6–Dimethyl–$_y$–Thiapyrone and N–Butyl–2, 6–Dimethyl–$_y$–Pyridone", 1974.

N. G. Rule, et al., J. Org. Chem., vol. 60, pp. 1665–1673, "Syntheses of 4H–Thiopyran–4–One 1,1–Dioxides as Precursors to Sulfone–Containing Analogues of Tetracyanoquinodimethane", 1995.

M. R. Detty, et al., J. Org. Chem., vol. 60, pp. 1674–1685, "Electron Transport in 4H–1,1–Dioxo–4–(Dicyanomethylidene)Thiopyrans. Investigation of X–Ray Structures of Neutral Molecules, Electrochemical Reduction to the Anion Radicals, and Absorption Properties and Epr Spectra of the Anion Radicals", 1995.

* cited by examiner

*Primary Examiner*—Elizabeth Mulvaney
(74) *Attorney, Agent, or Firm*—Oblon, Spivak, McClelland, Maier & Neustadt, P.C.

(57) ABSTRACT

An optical recording medium comprising a substrate and a recording layer on which recording and readout of information can be carried out by laser.

12 Claims, 4 Drawing Sheets

COMPOUND, OPTICAL RECORDING MEDIUM AND OPTICAL RECORDING METHOD

BACKGROUND OF THE INVENTION

1. Field of the Invention

The present invention relates to a write-once optical recording medium which employs an organic dye for a recording layer. Particularly, it relates to a novel compound corresponding to blue laser, a write-once optical recording medium and an optical recording method.

2. Discussion of Background

At present, various optical recording media such as CD-R/RW, DVD-R/RW and MO have been widely recognized and used as an external memory for an information processor such as a computer, since they can record a large amount of information, and random access is easy with them. Among these optical recording media, organic dye type optical recording media typified by CD-R and DVD-R are considered to be superior to others from such a viewpoint that they can easily be produced at a low cost.

Further, along with increase in the amount of information to be recorded, it has been desired to increase the recording density of media. In recent years, an optical recording medium on which high density recording/readout can be carried out by using laser with a short oscillation wavelength, such as blue laser which has significantly been developed, has been proposed.

In general, with respect to optical recording media commercially available as CD-R or DVD-R, for example, CD-R is designed to be applicable to recording/readout by a laser beam having a wavelength at a level of 780 nm, and DVD-R is designed to be applicable to recording/readout by a laser beam having a wavelength at a level of from 600 to 700 nm. Such a recording medium applicable to optical recording/readout by using a laser beam having a relatively long wavelength has such problems that when recording/readout is carried out by using laser with a shorter wavelength, the refractivity tends to be low, and recording/readout cannot be carried out. It is an object of the present invention to provide an organic dye type optical recording medium on which recording/readout can be carried out by blue laser with a shorter wavelength.

SUMMARY OF THE INVENTION

The present inventors have conducted various studies on organic dyes having a high sensitivity to blue laser and as a result, they have found that compounds of the following formulae [I] and [II] can be used for a recording layer of an optical recording medium corresponding to blue laser, and the present invention has been accomplished on the basis of this discovery.

Namely, the present invention provides an optical recording medium comprising a substrate and a recording layer on which recording and readout of information can be carried out by laser, formed on the substrate, wherein the recording layer contains a compound of the following formula [I] or [II], and an optical recording method, which comprises recording information on the optical recording medium by using a laser beam having a wavelength of from 350 to 530 nm:

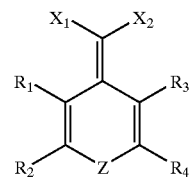

wherein each of $R_1$ to $R_4$ is a hydrogen atom or an optional substituent, provided that $R_1$ and $R_2$, and $R_3$ and $R_4$, may be bonded to form a hydrocarbon ring or a heterocyclic ring structure, and the hydrocarbon ring and the heterocyclic ring may have a substituent;

$X_1$ is an electro-withdrawing group, and $X_2$ is a hydrogen atom or —Q—Y (wherein Q is a direct bonding, a $C_{1-2}$ alkylene group, an arylene group or a heteroarylene group, and Y is an electro-withdrawing group, provided that the alkylene group, the arylene group and the heteroarylene group may have an optional substituent in addition to Y); and Z is —O—, —S—, —$SO_2$— or —$NR_5$— [wherein $R_5$ is a hydrogen atom, a hydrocarbon group which may be substituted, a heterocyclic group which may be substituted, a cyano group, a hydroxyl group, an amino group represented by —$NR_6R_7$ (wherein each of $R_6$ and $R_7$ which are independent of each other, is a hydrogen atom, a hydrocarbon group which may be substituted, a heterocyclic group which may be substituted or —$COR_8$ <wherein $R_8$ is a hydrocarbon group which may be substituted or a heterocyclic group which may be substituted>) or —$COR_9$ (wherein $R_9$ is a hydrocarbon group which may be substituted or a heterocyclic group which may be substituted), provided that when $R_5$ is a hydrocarbon group, it may be bonded with $R_2$ or $R_4$ to form a cyclic structure];

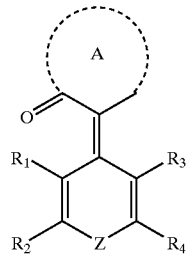

wherein each of $R_1$ to $R_4$ is a hydrogen atom or an optional substituent, provided that $R_1$ and $R_2$, and $R_3$ and $R_4$, may be bonded to form a hydrocarbon ring or a heterocyclic ring structure, and the hydrocarbon ring and the heterocyclic ring may have a substituent;

the ring A is a carbocyclic ketone ring or a heterocyclic ketone ring which may have a substituent, formed together with C=O; and Z is —O—, —S—, —$SO_2$— or —$NR_5$— [wherein $R_5$ is a hydrogen atom, a hydrocarbon group which may be substituted, a heterocyclic group which may be substituted, a cyano group, a hydroxyl group, an amino group represented by —$NR_6R_7$ (wherein each of $R_6$ and $R_7$ which are independent of each other, is a hydrogen atom, a hydrocarbon group which may be substituted, a heterocyclic group which may be substituted or —$COR_8$ <wherein $R_8$ is a hydrocarbon group which may be substituted or a heterocyclic group which may be substituted>) or —COR$_9$ (wherein R$_9$ is a hydrocarbon group which may be substituted or a heterocyclic group which may be substituted), provided that when R$_5$ is a hydrocarbon group, it may be bonded with R$_2$ or R$_4$ to form a cyclic structure].

The present invention further provides a novel compound of the following formula [I']:

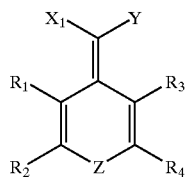

wherein each of R$_1$ to R$_4$ is a hydrogen atom or an optional substituent, provided that R$_1$ and R$_2$, and R$_3$ and R$_4$, may independently be bonded to form a hydrocarbon ring or a heterocyclic ring structure, and the hydrocarbon ring and the heterocyclic ring may have a substituent; each of X$_1$ and Y is an electro-withdrawing group, provided that one of X$_1$ and Y is a cyano group, and the other is —COOR$_{11}$ (wherein R$_{11}$ is a hydrogen atom, a hydrocarbon group which may be substituted or a heterocyclic group which may be substituted) or —SO$_2$R$_{17}$ (wherein R$_{17}$ is a hydrocarbon group which may be substituted or a heterocyclic group which may be substituted); and Z is —NR$_5$— (wherein in a case where one of X$_1$ and Y is —COOR$_{11}$, R$_5$ is a C$_{3-18}$ branched alkyl group which may be substituted, a C$_{3-18}$ cyclic alkyl group which may be substituted or a 5- or 6-membered saturated heterocyclic group which may be substituted, and in a case where one of X$_1$ and Y is —SO$_2$R$_{17}$, R$_5$ is a C$_{1-18}$ linear or branched alkyl group which may be substituted, a C$_{3-18}$ cyclic alkyl group which may be substituted or a 5- or 6-membered saturated heterocyclic group which may be substituted).

DETAILED DESCRIPTION OF THE PREFERRED EMBODIMENTS

Figure 1:
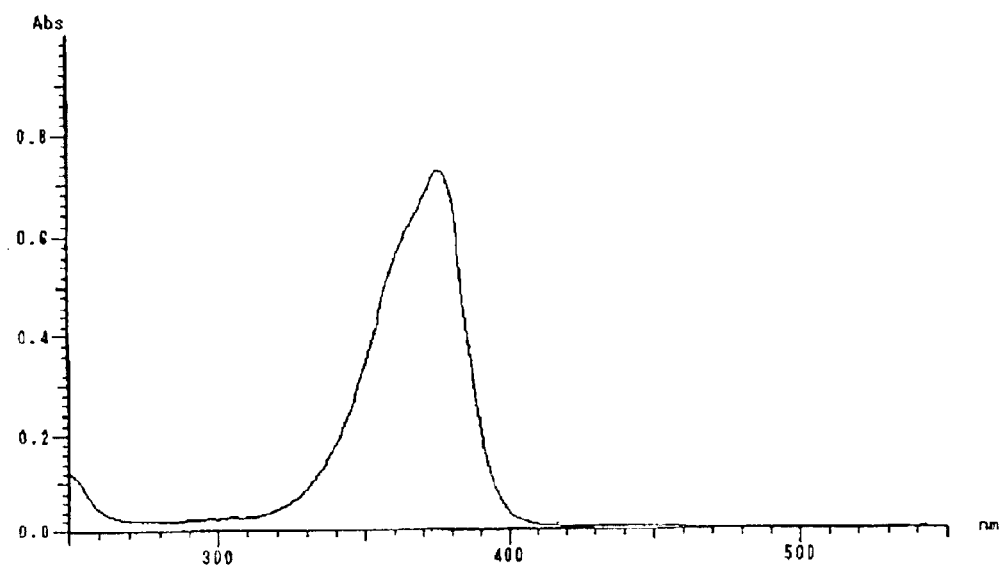
FIG. 1 illustrates an absorption spectrum of a dye of the compound (31) synthesized in Example 4 in a 5 mg/l chloroform solution.

Now, the present invention will be described in detail with reference to the preferred embodiments.

The compound used for the recording layer of the present invention is preferably a dye compound having appropriate absorption in a blue light region of from 350 to 530 nm, and applicable to recording by blue laser. In the present invention, as such a dye, a dye compound of the above formula [I] or [II] is used. The compounds of the above formulae [I] and [II] will be explained below.

In the above formulae [I] and [II] which represent the dye compounds of the present invention, each of R$_1$ to R$_4$ which are independent one another, is a hydrogen atom or an optional substituent, and the optional substituent may further be substituted. Examples of the optional substituent are as follows. C$_{1-18}$ linear or branched alkyl groups which may be substituted, such as a methyl group, an ethyl group, a propyl group, an isopropyl group, a n-butyl group, a sec-butyl group, a tert-butyl group and a n-heptyl group; C$_{3-18}$ cyclic alkyl groups which may be substituted such as a cyclopropyl group, a cyclopentyl group, a cyclohexyl group and an adamantyl group; C$_{2-18}$ linear or branched alkenyl groups which may be substituted such as a vinyl group, a propenyl group and a hexenyl group; C$_{3-18}$ cyclic alkenyl groups which may be substituted such as a cyclopentenyl group and a cyclohexenyl group; heterocyclic groups which may be substituted such as a 2-thienyl group, a 2-pyridyl group, a 4-piperidyl group and a morpholino group; C$_{6-18}$ aryl groups which may be substituted such as a phenyl group, a tolyl group, a xylyl group and a mesityl group; C$_{7-20}$ aralkyl groups which may be substituted such as a benzyl group and a phenethyl group; C$_{1-18}$ linear or branched alkoxy groups which may be substituted such as a methoxy group, an ethoxy group, a n-propoxy group, an isopropoxy group, a n-butoxy group, a sec-butoxy group and a tert-butoxy group; C$_{3-18}$ linear or branched alkenyloxy groups which may be substituted such as a propenyloxy group, a butenyloxy group and a pentenyloxy group; and C$_{1-18}$ linear or branched alkylthio groups which may be substituted such as a methylthio group, an ethylthio group, a n-propylthio group, a n-butylthio group, a sec-butylthio group and a tert-butylthio group, may be mentioned.

Other specific examples include halogen atoms such as a fluorine atom, a chlorine atom and a bromine atom; a nitro group; a nitroso group; a cyano group; an isocyano group; a cyanato group; an isocyanato group; a thiocyanato group; an isothiocyanato group; a mercapto group; a hydroxyl group; a hydroxyamino group; a formyl group; a sulfonic acid group; a carboxyl group; an acyl group represented by —COR$_{20}$, an amino group represented by —NR$_{21}$R$_{22}$, an acylamino group represented by —NHCOR$_{23}$, a carbamate group represented by —NHCOOR$_{24}$, a carboxylate group represented by —COOR$_{25}$, an acyloxy group represented by —OCOR$_{26}$, a carbamoyl group represented by —CONR$_{27}$R$_{28}$, a sulfonyl group represented by —SO$_2$R$_{29}$, a sulfamoyl group represented by —SO$_2$NR$_{30}$R$_{31}$, a sulfonate group represented by —SO$_3$R$_{32}$, an sulfonamide group represented by —NHSO$_2$R$_{33}$ and an sulfinyl group represented by —SOR$_{34}$.

The position of such a substituent is not particularly limited, and the number of the substituent may be within a range of from 1 to 4. In a case where a plurality of substituents is present, they may be the same or different.

Here, each of R$_{20}$, R$_{23}$, R$_{24}$, R$_{25}$, R$_{26}$, R$_{29}$, R$_{32}$, R$_{33}$ and R$_{34}$ is a hydrocarbon group which may be substituted or a heterocyclic group which may be substituted, and each of R$_{21}$, R$_{22}$, R$_{27}$, R$_{28}$, R$_{30}$ and R$_{31}$ is a hydrogen atom, a hydrocarbon group which may be substituted or a heterocyclic group which may be substituted.

The hydrocarbon group represented by each of R$_{20}$ to R$_{34}$ is a C$_{1-18}$ linear or branched alkyl group such as a methyl group, an ethyl group, a propyl group, an isopropyl group, a n-butyl group, a sec-butyl group, a tert-butyl group or a n-heptyl group, a $C_{3-18}$ cyclic alkyl group such as a cyclopropyl group, a cyclopentyl group, a cyclohexyl group or an adamantyl group, a $C_{2-18}$ linear or branched alkenyl group such as a vinyl group, a propenyl group or a hexenyl group, a $C_{3-18}$ cyclic alkenyl group such as a cyclopentenyl group or a cyclohexenyl group, a $C_{7-20}$ aralkyl group such as a benzyl group or a phenethyl group, or a $C_{6-18}$ aryl group such as a phenyl group, a tolyl group, a xylyl group or a mesityl group. The alkyl chain moiety or the aryl group moiety in such a group may further be substituted with a substituent which the alkyl chain moiety in each of $R_1$ to $R_4$ may have, as described hereinafter.

Further, the heterocyclic group represented by each of $R_{20}$ to $R_{34}$ may be a saturated heterocyclic ring such as a 4-piperidyl group, a morpholino group, a 2-morpholinyl group or a piperazyl group, or may be an aromatic heterocyclic ring such as a 2-furyl group, a 2-pyridyl group, a 2-thiazolyl group or a 2-quinolyl group. Such a heterocyclic group may contain a plurality of hetero atoms or may further have a substituent, and the bonding position is not limited. A preferred structure as a heterocyclic ring is a 5- or 6-membered saturated heterocyclic ring, or a 5- or 6-membered monocyclic or its condensed bicyclic aromatic heterocycle ring.

Preferred specific examples of each of an acyl group which may be substituted, represented by —$COR_{20}$; an amino group which may be substituted, represented by —$NR_{21}R_{22}$; an acylamino group which may be substituted, represented by —$NHCOR_{23}$; a carbamate group which may be substituted, represented by —$NHCOOR_{24}$; a carboxylate group which may be substituted, represented by —$COOR_{25}$; an acyloxy group which may be substituted, represented by —$OCOR_{26}$; a carbamoyl group which may be substituted, represented by —$CONR_{27}R_{28}$; a sulfonyl group which may be substituted, represented by —$SO_2R_{29}$; a sulfamoyl group which may be substituted, represented by —$SO_2NR_{30}R_{31}$, a sulfonate group which may be substituted, represented by —$SO_3R_{32}$; a sulfonamide group which may be substituted, represented by —$NHSO_2R_{33}$; and a sulfinyl group which may be substituted, represented by —$SOR_{34}$, are shown below.

Acyl groups (—$COR_{20}$):

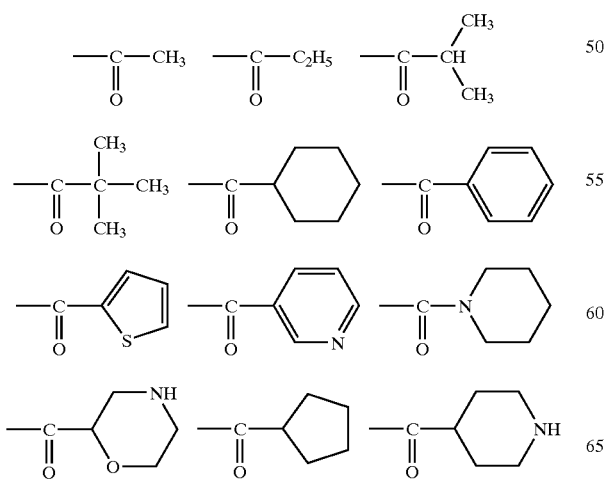

Amino groups (—$NR_{21}R_{22}$):

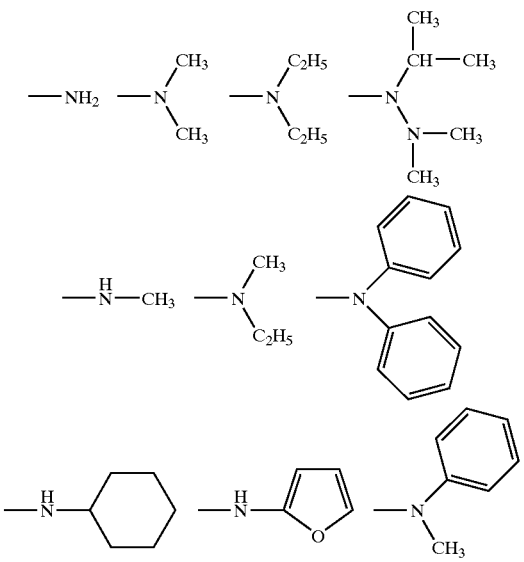

Acylamino groups (—$NHCOR_{23}$):

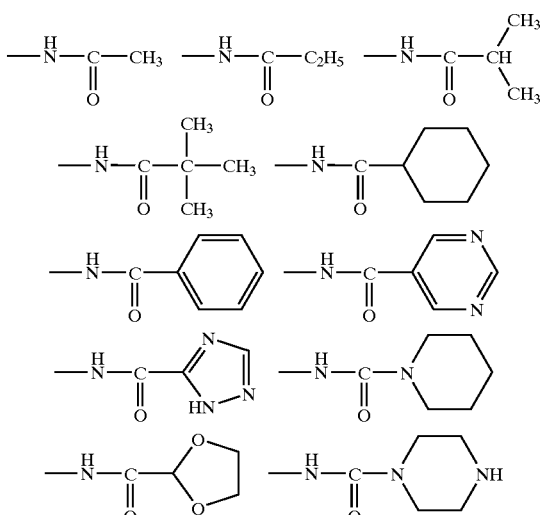

Carbamate groups (—$NHCOOR_{24}$):

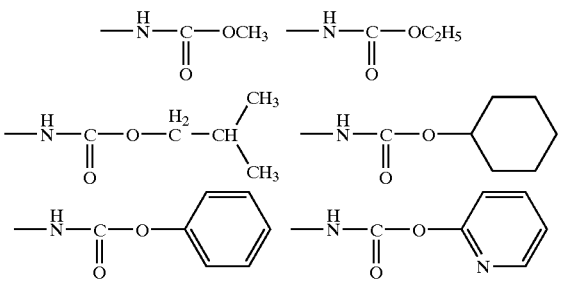

Carboxylate groups (—$COOR_{25}$):

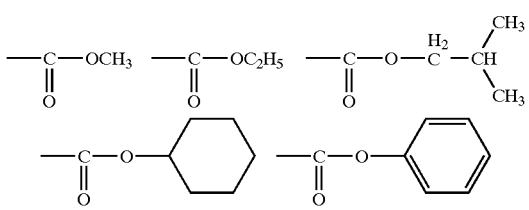

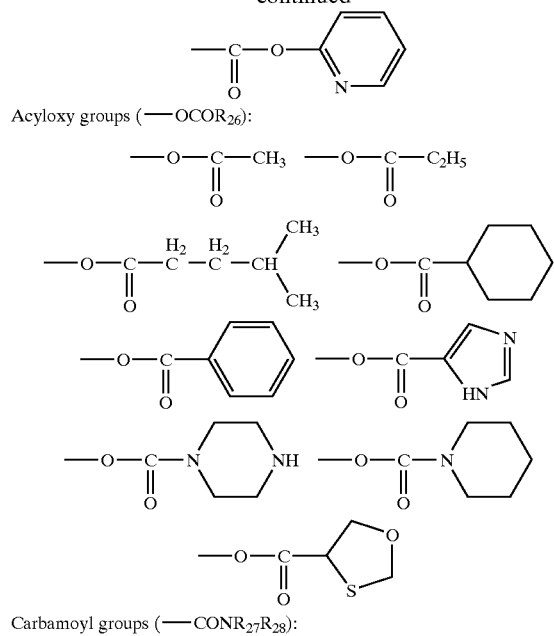
Acyloxy groups (—OCOR$_{26}$):
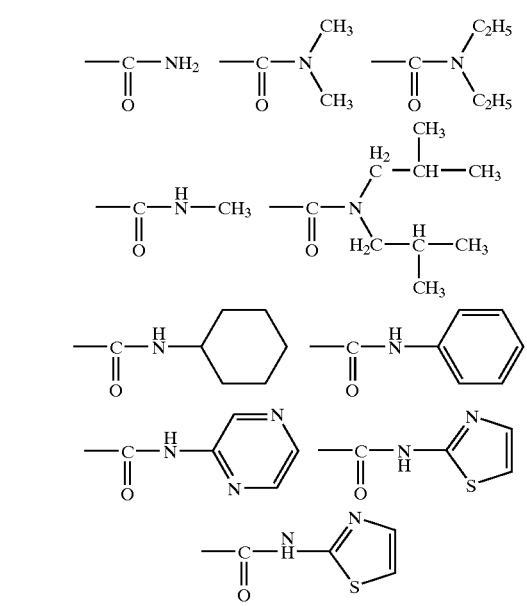
Carbamoyl groups (—CONR$_{27}$R$_{28}$):
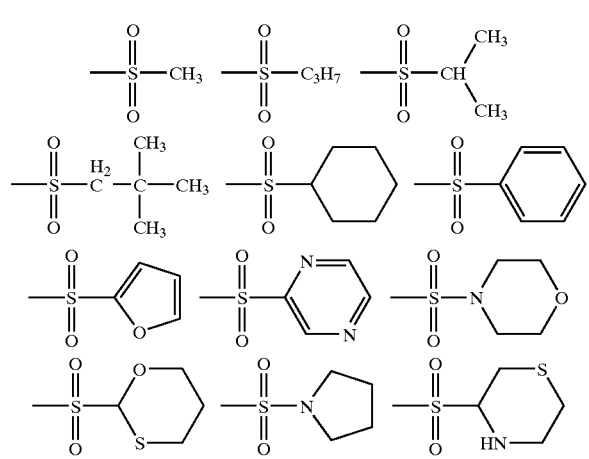
Sulfonyl groups (—SO$_2$R$_{29}$):
Sulfamoyl groups (—SO$_2$NR$_{30}$R$_{31}$):
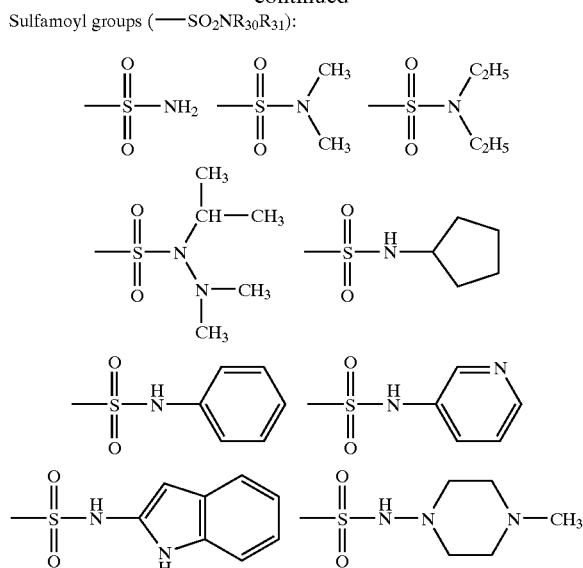
Sulfonate groups (—SO$_3$R$_{32}$):
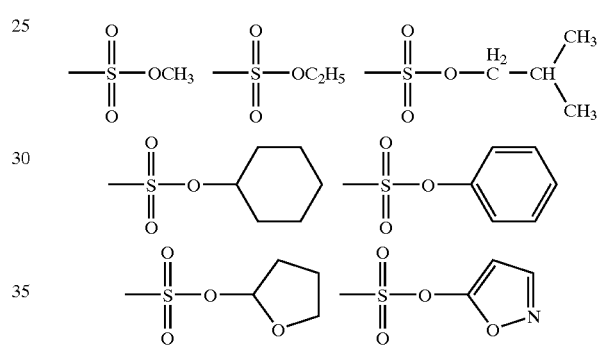
Sulfonamide groups (—NHSO$_2$R$_{33}$):
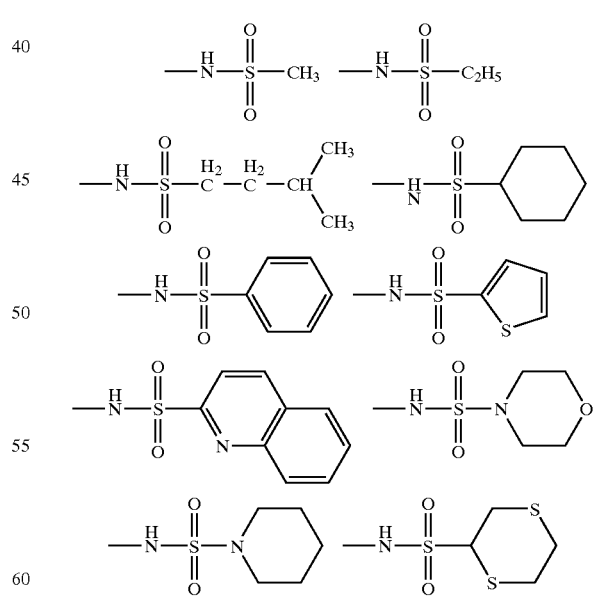
Sulfinyl groups (—SOR$_{34}$):
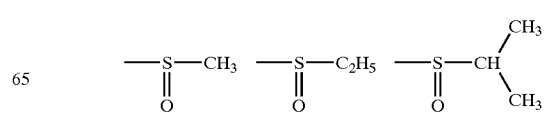

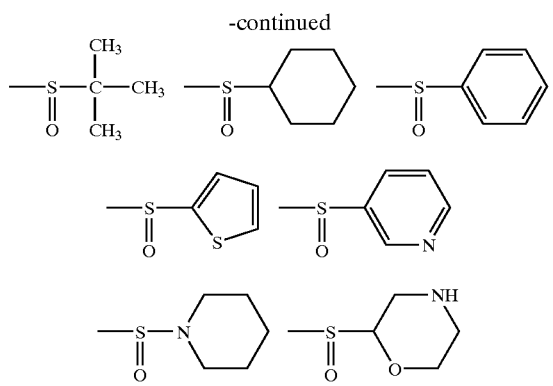

The alkyl chain moiety in the linear or branched alkyl group, the cyclic alkyl group, the linear or branched alkenyl group, the cyclic alkenyl group, the linear or branched alkoxy group and the linear or branched alkylthio group represented by each of $R_1$ to $R_4$, and the alkyl group represented by each of $R_{20}$ to $R_{33}$ may further have a substituent, and the substituent may, for example, be a $C_{1-10}$ alkoxy group such as a methoxy group, an ethoxy group, a n-propoxy group, an isopropoxy group, a n-butoxy group, a sec-butoxy group or a tert-butoxy group; a $C_{2-12}$ alkoxyalkoxy group such as a methoxymethoxy group, an ethoxymethoxy group, a propoxymethoxy group, an ethoxyethoxy group, a propoxyethoxy group or a methoxybutoxy group; a $C_{3-15}$ alkoxyalkoxyalkoxy group such as a methoxymethoxymethoxy group, a methoxymethoxyethoxy group, a methoxyethoxymethoxy group, a methoxymethoxyethoxy group or an ethoxyethoxymethoxy group; a $C_{6-12}$ aryloxy group such as a phenoxy group, a tolyloxy group, a xylyloxy group or a naphthyloxy group; or a $C_{2-12}$ alkenyloxy group such as an aryloxy group or a vinyloxy group.

Further, examples of another substituent include heterocyclic groups such as a 2-thienyl group, a 2-pyridyl group, a 4-piperidyl group and a morpholino group; a cyano group; a nitro group; a hydroxyl group; an amino group; $C_{1-10}$ alkylamino groups such as a N,N-dimethylamino group and a N,N-diethylamino group; $C_{1-6}$ alkylsulfonylamino groups such as a methylsulfonylamino group, an ethylsulfonylamino group and a n-propylsulfonylamino group; halogen atoms such as a fluorine atom, a chlorine atom and a bromine atom; $C_{2-7}$ alkoxycarbonyl groups such as a methoxycarbonyl group, an ethoxycarbonyl group, a n-propoxycarbonyl group, an isopropoxycarbonyl group and a n-butoxycarbonyl group; $C_{2-7}$ alkylcarbonyloxy groups such as a methylcarbonyloxy group, an ethylcarbonyloxy group, a n-propylcarbonyloxy group, an isopropylcarbonyloxy group and a n-butylcarbonyloxy group; and $C_{2-7}$ alkoxycarbonyloxy groups such as a methoxycarbonyloxy group, an ethoxycarbonyloxy group, a n-propoxycarbonyloxy group, an isopropoxycarbonyloxy group and a n-butoxycarbonyloxy group.

Further, $R_1$ and $R_2$, and $R_3$ and $R_4$, may independently be bonded to form a condensed ring. The condensed ring formed by them may be a saturated or unsaturated hydrocarbon ring, or a saturated or unsaturated heterocyclic ring containing one or more hetero atoms. The number of members in the cyclic structure is not particularly limited, but preferred is a 5 to 7-membered ring, particularly preferred is a 5- or 6-membered, for both of hydrocarbon ring and heterocyclic ring. Preferred condensed ring structures are shown below.

wherein the condensed ring structures, each of $D_1$ to $D_3$ is an optional substituent.

Further, such a condensed ring may be substituted with the above-described substituted or unsubstituted alkyl group. The substituent which the alkyl group may have may, for example, be the same type as the substituent which the alkyl chain moiety in each of the above $R_1$ to $R_4$ may have.

Preferred as the substituent represented by each of $R_1$ to $R_4$ may be a $C_{1-12}$ linear or branched alkyl group which may be substituted, a $C_{3-12}$ cyclic alkyl group which may be substituted, a $C_{2-12}$ linear or branched alkenyl group which may be substituted, a 5- or 6-membered saturated heterocyclic ring, a 5- or 6-membered monocyclic or condensed bicyclicheteroaromatic ring group, a $C_{6-18}$ aryl group which may be substituted, a $C_{7-20}$ aralkyl group which may be substituted, a $C_{1-12}$ linear or branched alkoxyl group which may be substituted, a $C_{1-12}$ linear or branched alkylthio group which may be substituted, a halogen atom, a nitro group, a cyano group, a mercapto group, a hydroxyl group, an acyl group represented by —$COR_{20}$, an amino group represented by —$NR_{21}R_{22}$, an acylamino group represented by —$NHCOR_{23}$, a carbamate group represented by —$NHCOOR_{24}$, a carboxylate group represented by —$COOR_{25}$, an acyloxy group represented by —$OCOR_{26}$, a carbamoyl group represented by —$CONR_{27}R_{28}$ or a sulfonamide group represented by —$NHSO_2R_{33}$, and when $R_1$ and $R_2$, and $R_3$ and $R_4$ form a condensed ring, preferred is a 5- or 6-membered hydrocarbon ring which may be substituted or a 5- or 6-membered heterocyclic ring which may be substituted.

Particularly preferred as the substituent represented by each of $R_1$ to $R_4$ is a $C_{1-12}$ linear or branched alkyl group which may be substituted, a $C_{3-18}$ cyclic alkyl group which may be substituted, a $C_{1-12}$ linear or branched alkoxyl group which may be substituted, a 5- or 6-membered saturated heterocyclic group, a 5- or 6-membered heteroaromatic ring group, a $C_{6-18}$ aryl group, a $C_{7-20}$ aralkyl group, a $C_{1-12}$ linear or branched alkylthio group which may be substituted, a halogen atom, a nitro group, a hydroxyl group, an acyl group represented by —$COR_{20}$, an acyloxy group represented by —$OCOR_{26}$, an amino group represented by —$NR_{21}R_{22}$, a carboxylate group represented by —$COOR_{25}$, a carbamoyl group represented by —$CONR_{27}R_{28}$ or a sulfonamide group represented by —$NHSO_2R_{33}$, and when $R_1$ and $R_2$, and $R_3$ and $R_4$, form condensed rings, one of them is a benzene ring structure.

In the above formulae [I] and [II], z is —O—, —S—, —$SO_2$— or —$NR_5$—.

Here, $R_5$ is a hydrogen atom, a hydrocarbon group which may be substituted, a heterocyclic group which may be substituted, a cyano group, a hydroxyl group, —$NR_6R_7$ or —$COR_9$.

The hydrocarbon group which may be substituted, represented by $R_5$, is a $C_{1-18}$ linear or branched alkyl group such as a methyl group, an ethyl group, a propyl group, an isopropyl group, a n-butyl group, a sec-butyl group, a tert-butyl group or a n-heptyl group, a $C_{3-18}$ cyclic alkyl group such as a cyclopropyl group, a cyclopentyl group, a cyclohexyl group or an adamantyl group, a $C_{2-18}$ linear or branched alkenyl group such as a vinyl group, propenyl group or a hexenyl group, a $C_{3-18}$ cyclic alkenyl group such as a cyclopentenyl group or a cyclohexenyl group, a $C_{7-20}$ aralkyl group such as a benzyl group or a phenethyl group, or a $C_{6-18}$ aryl group such as a phenyl group, a tolyl group, a xylyl group or a mesityl group. The alkyl chain moiety or the aryl group moiety in such a group may further be substituted with a substituent which the alkyl chain moiety in each of the above $R_1$ to $R_4$ may have.

The heterocyclic group which may be substituted, represented by $R_5$, may be either a saturated heterocyclic ring such as a 4-piperidyl group, a morpholino group, a 2-morpholinyl group or a piperazyl group, or an aromatic heterocyclic ring such as a 2-furyl group, a 2-pyridyl group, a 2-thiazolyl group or a 2-quinolyl group. Such a heterocyclic group may contain a plurality of hetero atoms or may further have a substituent, and the bonding position is not limited. A preferred structure as the heterocyclic ring is a 5- or 6-membered saturated heterocyclic ring, or a 5- or 6-membered monocyclic or its condensed bicyclic aromatic heterocyclic ring. Such a group may further be substituted with a substituent which the alkyl chain moiety of each of the above $R_1$ to $R_4$ may have.

When $R_5$ has an alkyl chain as the hydrocarbon group which may be substituted, it may be bonded with $R_2$ or $R_4$ to form a saturated or unsaturated hydrocarbon ring, or a saturated or unsaturated heterocyclic ring structure. The number of members in the cyclic structure is not particularly limited, but preferred is a 5- or 6-membered ring for both of hydrocarbon ring and heterocyclic ring. Preferred condensed ring structures are shown below.

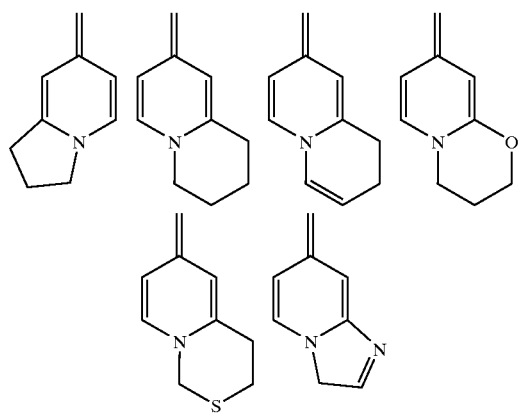

Each of $R_6$ and $R_7$ in —$NR_6R_7$ represented by $R_5$, which are independent of each other, is a hydrogen atom, a hydrocarbon group which may be substituted, a heterocyclic group which may be substituted or —$COR_8$. As each of $R_6$ and $R_7$, the same groups as the hydrocarbon groups and the heterocyclic groups as exemplified as $R_5$ may be mentioned, and preferred is a hydrogen atom, a $C_{1-18}$ linear or branched alkyl group which may be substituted, a $C_{7-20}$ aralkyl group which may be substituted, a $C_{6-18}$ aryl group which may be substituted or a heterocyclic group which may be substituted. $R_6$ and $R_7$ may be bonded to form a condensed ring. The condensed ring formed by them may be either a saturated or unsaturated hydrocarbon ring or a saturated or unsaturated heterocyclic ring containing one or more hetero atoms. The number of members in the cyclic structure is not particularly limited, but preferred is a 5- to 7-membered ring, particularly preferred is a 5- or 6-membered ring for both of hydrocarbon ring and heterocyclic ring.

$R_8$ is a hydrocarbon group which may be substituted or a heterocyclic group which may be substituted, similar to $R_5$, and preferred is a $C_{1-18}$ linear or branched alkyl group, a $C_{7-20}$ aralkyl group which may be substituted or a $C_{6-20}$ aryl group which may be substituted.

$R_9$ in —$COR_9$ represented by $R_5$ may be a hydrocarbon group which may be substituted or a heterocyclic group which may be substituted, and in the same manner as $R_8$, preferred is a $C_{1-18}$ linear or branched alkyl group, a $C_{7-20}$ aralkyl group which may be substituted or a $C_{6-20}$ aryl group which may be substituted.

The alkyl chain moiety or the aryl group moiety in each of $R_6$ to $R_9$ may further be substituted with a substituent which the alkyl chain moiety in each of the above $R_1$ to $R_4$ may have.

Preferred as Z is —O—, —S—, —$SO_2$— or —$NR_5$— [wherein $R_5$ is a hydrogen atom, a $C_{1-18}$ linear or branched alkyl group which may be substituted, a $C_{3-18}$ cyclic alkyl group which may be substituted, a $C_{6-18}$ aryl group which may be substituted, a $C_{7-20}$ aralkyl group which may be substituted, a 5- or 6-membered saturated heterocyclic group which may be substituted, an amino group represented by —$NR_6R_7$ (wherein each of $R_6$ and $R_7$ which are independent of each other, is a hydrogen atom, a $C_{1-18}$ linear or branched alkyl group which may be substituted, a $C_{6-18}$ aryl group which may be substituted, a $C_{7-20}$ aralkyl group which may be substituted or a heterocyclic group which may be substituted)].

More preferably, Z is —$NR_5$— (wherein $R_5$ is a $C_{1-18}$ linear or branched alkyl group which may be substituted, a $C_{3-18}$ cyclic alkyl group which may be substituted or a 5- or 6-membered saturated heterocyclic group which may be substituted). Particularly preferably, $R_5$ is a $C_{1-18}$ branched alkyl group which may be substituted, a $C_{3-18}$ cyclic alkyl group which may be substituted, or a 5- or 6-membered saturated heterocyclic group which may be substituted. Most preferably, $R_5$ is a $C_{1-12}$ branched alkyl group which may be substituted, a $C_{3-8}$ cyclic alkyl group which may be substituted or a 5- or 6-membered saturated heterocyclic group which may be substituted.

Examples of preferred —$NR_5$— are shown below.

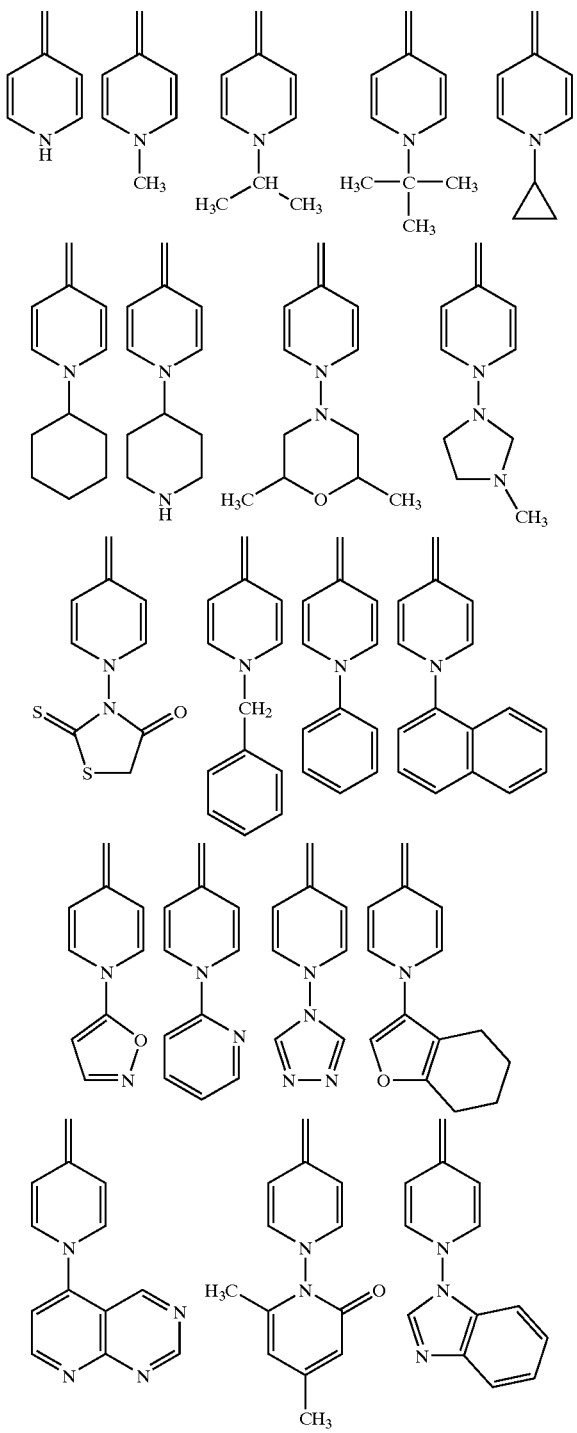
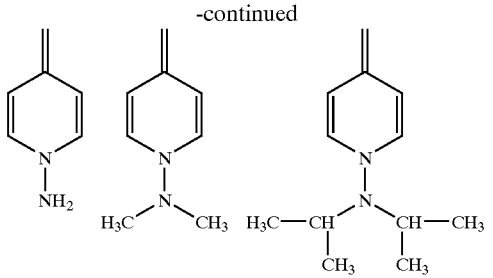
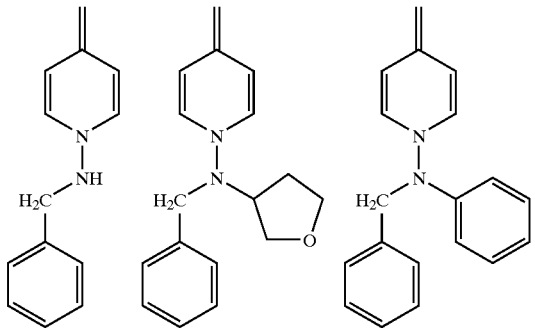
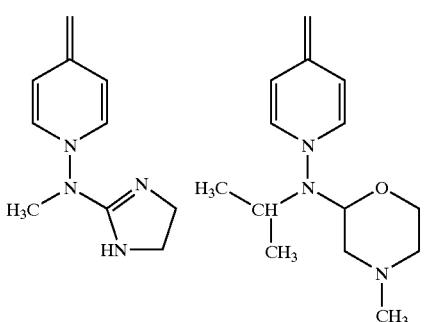
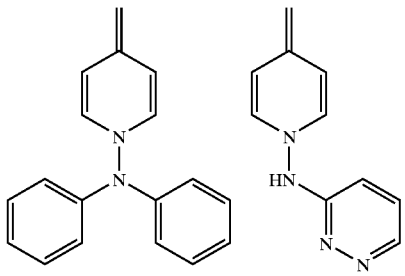
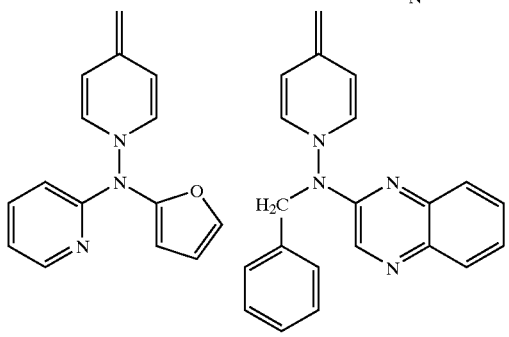

In the above formula [I], $X_1$ is an electro-withdrawing group, and $X_2$ is a hydrogen atom or —Q—Y. Here, Q is a connecting group, and is a $C_{1-2}$ alkylene group, an arylene group or a heteroarylene group, or a direct bonding to Y without such a connecting group. Each of Y and $X_1$ which are independent of each other, is an electro-withdrawing group.

The electro-withdrawing group represented by each of $X_1$ and Y is one having a positive sigma constant σ (σm and σp, particularly σp) in Hammett's rule. Examples of which include a cyano group, a nitro group, a nitroso group, a halogen atom, a carboxyl group, a formyl group, an acyl group, a carboxylate group, a carbamoyl group, a trialkylamino group, an alkyl group substituted with halogen such as a trifluoromethyl group, a sulfonic acid group, a sulfonate group, a sulfonyl group, a sulfamoyl group and a sulfinyl group.

Preferred as the electro-withdrawing group as each of $X_1$ and Y, is a cyano group, a nitro group, an alkyl group substituted with halogen, an acyl group represented by —$COR_{10}$, a carboxylate group represented by —$COOR_{11}$, a carbamoyl group represented by —$CONR_{12}R_{13}$, a sulfinyl group represented by —$SOR_{16}$, a sulfonyl group represented by —$SO_2R_{17}$, or a sulfamoyl group represented by —$SO_2NR_{18}R_{19}$. Particularly preferred is a cyano group, a carboxylate group represented by —$COOR_{11}$ or a sulfonyl group represented by —$SO_2R_{17}$. Most preferred is a case where one of $X_1$ and Y is a cyano group, and the other is —$COOR_{11}$ (wherein $R_{11}$ is a hydrogen atom, a hydrocarbon group which may be substituted or a heterocyclic group which may be substituted) or —$SO_2R_{17}$ (wherein $R_{17}$ is a hydrocarbon group which may be substituted or a heterocyclic group which may be substituted).

$R_{10}$ in the acyl group represented by —$COR_{10}$ is a hydrocarbon group which may be substituted or a heterocyclic group which may be substituted, and preferred as $R_{10}$ is a $C_{1-18}$ linear or branched alkyl group which may be substituted, a $C_{7-20}$ aralkyl group which may be substituted, a $C_{6-18}$ aryl group which may be substituted, a 5- to 7-membered saturated heterocyclic group which may be substituted, or a 5- or 6-membered monocyclic or its condensed bicyclic heteroaromatic ring which may be substituted. Specifically, an acyl group such as an acetyl group, a propionyl group, an isovaleryl group, a pivaloyl group, a benzoyl group, a 2-thenoyl group, a 2-furoyl group or a cyclohexanoyl group may be mentioned.

$R_{11}$ in the carboxylate group represented by —$COOR_{11}$ is a hydrocarbon group which may be substituted or a heterocyclic group which may be substituted, and is preferably a $C_{1-18}$ linear or branched alkyl group which may be substituted, a $C_{6-18}$ aryl group which may be substituted, a $C_{7-20}$ aralkyl group which may be substituted, a 5- to 7-membered saturated heterocyclic ring, a 5- or 6-membered monocyclic or its condensed bicyclic heteroaromatic ring which may be substituted. Specifically, a carboxylate group may be mentioned such as a methoxycarbonyl group, an ethoxycarbonyl group, an isobutoxycarbonyl group, a phenoxycarbonyl group, a cyclohexyloxycarbonyl group or a 2-pyridyloxy carbonyl group.

Each of $R_{12}$ and $R_{13}$ in the carbamoyl group represented by —$CONR_{12}R_{13}$, which are independent of each other, is a hydrogen atom, a hydrocarbon group which may be substituted, a heterocyclic group which may be substituted, an amino group which may be substituted, an acylamino group which may be substituted, a carbamate group which may be substituted, —$COR_{14}$ or —$COOR_{15}$.

Here, each of $R_{14}$ and $R_{15}$ is an optional substituent, and preferred as the substituent is a $C_{1-18}$ linear or branched alkyl group which may be substituted, a $C_{6-18}$ aryl group which may be substituted or an amino group which may be substituted.

Preferred as each of $R_{12}$ and $R_{13}$ may be a hydrogen atom, a $C_{1-18}$ linear or branched alkyl group which may be substituted, a $C_{6-18}$ aryl group which may be substituted, a $C_{7-20}$ aralkyl group which may be substituted, a 5- to 7-membered saturated heterocyclic ring, a 5- or 6-membered monocyclic or its condensed bicyclic heteroaromatic ring which may be substituted, an amino group which may be substituted, —$COR_{14}$ or —$COOR_{15}$.

Structures of the carbamoyl group represented by —$CONR_{12}R_{13}$ are shown below.

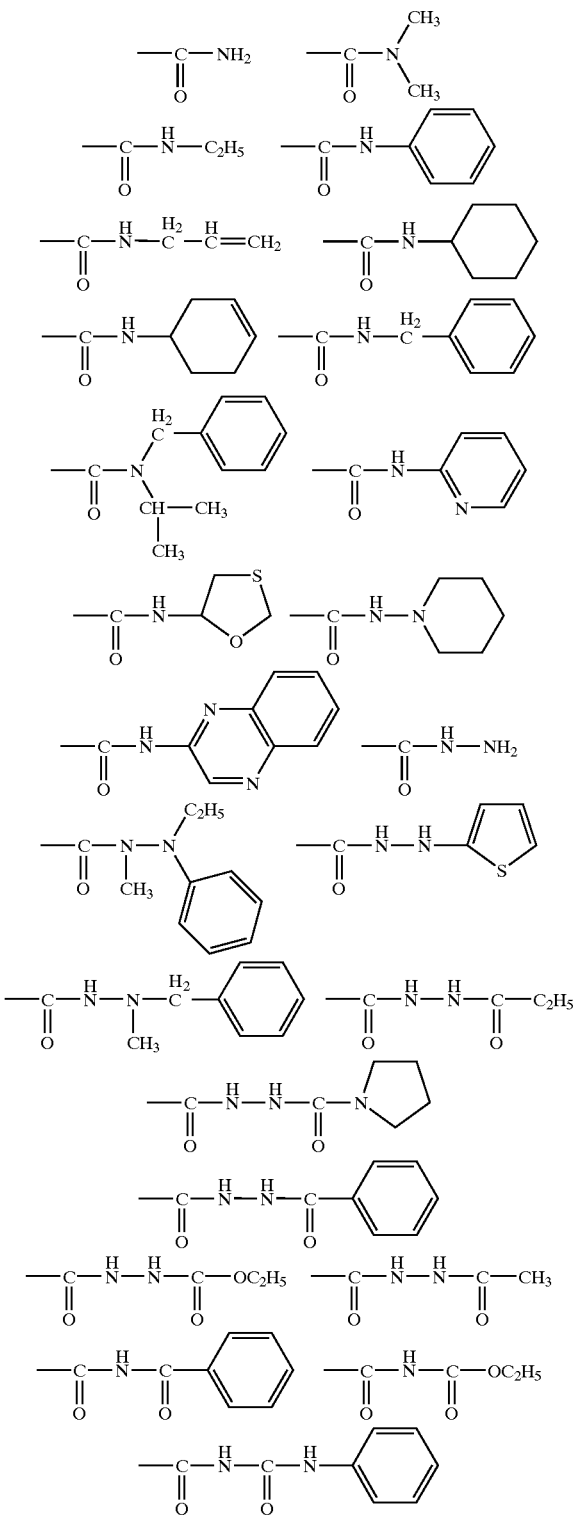

$R_{16}$ in the sulfinyl group represented by $-SOR_{16}$ is a hydrocarbon group which may be substituted or a heterocyclic group which may be substituted, and is preferably a $C_{1-18}$ linear or branched alkyl group which may be substituted, a $C_{6-18}$ aryl group which may be substituted, a $C_{7-20}$ aralkyl group which may be substituted, a 5- to 7-membered saturated heterocyclic ring, or a 5- or 6-membered monocyclic or its condensed bicyclic heteroaromatic ring which may be substituted. Specifically, the following sulfinyl groups and the like may be mentioned.

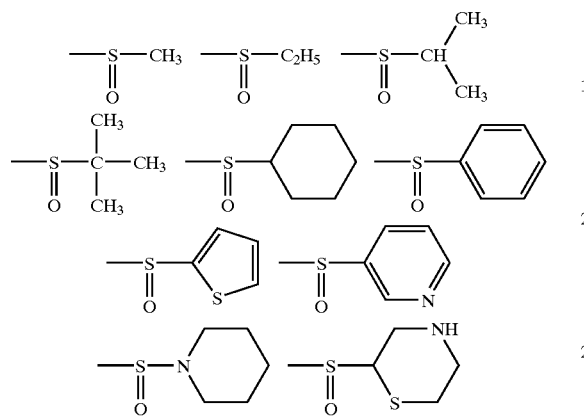

$R_{17}$ in the sulfonyl group represented by $-SO_2R_{17}$ is a hydrocarbon group which may be substituted or a heterocyclic group which may be substituted, and is preferably a $C_{1-18}$ linear or branched alkyl group which may be substituted, a $C_{6-18}$ aryl group which may be substituted, a $C_{7-20}$ aralkyl group which may be substituted, a 5- to 7-membered saturated heterocyclic ring, or a 5- to 6-membered monocyclic or its condensed bicyclic heteroaromatic ring which may be substituted. Specifically, the following sulfonyl groups and the like may be mentioned.

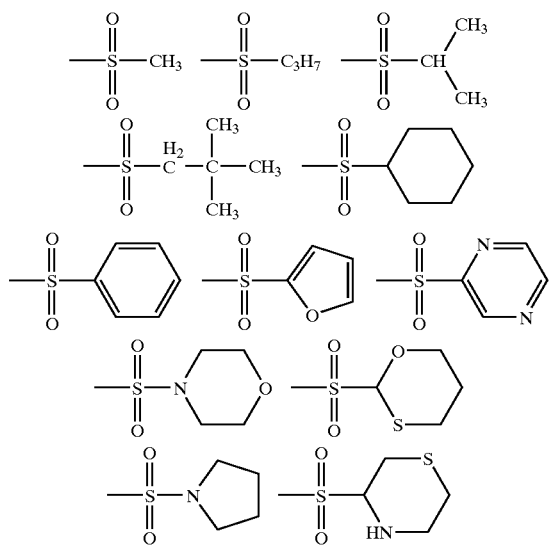

Each of $R_{18}$ and $R_{19}$ in the sulfamoyl group represented by $-SO_2NR_{18}R_{19}$ is a hydrogen atom, a hydrocarbon group which may be substituted or a heterocyclic group which may be substituted, and is preferably a hydrogen atom, a $C_{1-18}$ linear or branched alkyl group which may be substituted, a $C_{6-18}$ aryl group which may be substituted, a $C_{7-18}$ aralkyl group which may be substituted, a 5- to 7-membered saturated heterocyclic ring, or a 5- or 6-membered monocyclic or its condensed bicyclic heteroaromatic ring which may be substituted. Specifically, the following sulfamoyl groups and the like may be mentioned.

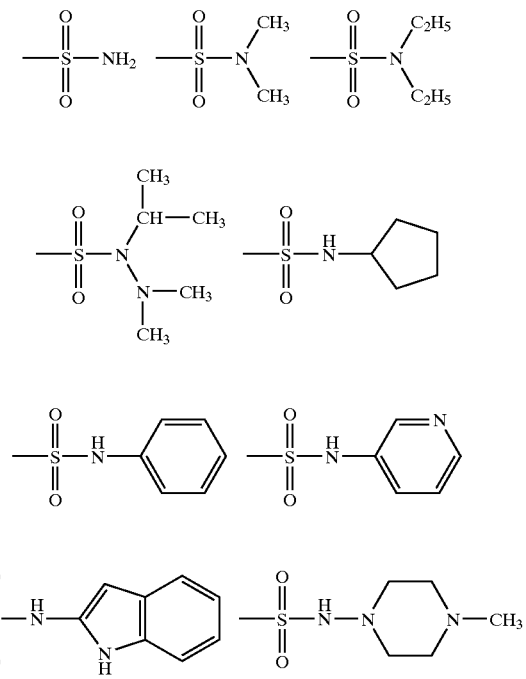

Specifically, as the hydrocarbon group which may be substituted and the heterocyclic group which may be substituted represented by each of the above $R_{10}$ to $R_{19}$, the same groups as for each of the above $R_{20}$ to $R_{34}$ may be mentioned.

The connecting group represented by Q is a $C_{1-2}$ alkylene group, an arylene group or a heteroarylene group, and in the case of an alkylene group, the carbon atom may have a substituent which the above alkyl chain may have, other than a hydrogen atom, or may have an alkyl chain branched therefrom.

In a case where Q is a 6-membered arylene or heteroarylene group, the electro-withdrawing group Y is located preferably on the ortho-position or para-position relative to the bonding cite, and in a case where it is a 5-membered heteroarylene group, the bonding cite and the electro-withdrawing group are on 2- and 4-positions. Further, a plurality of Y's may be bonded to such a connecting group. Further, there may be a substituent at a position other than the carbon to which Y is bonded.

Preferred bonding structures of such a connecting group and an electro-withdrawing group are shown below.

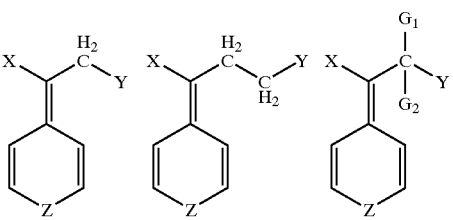

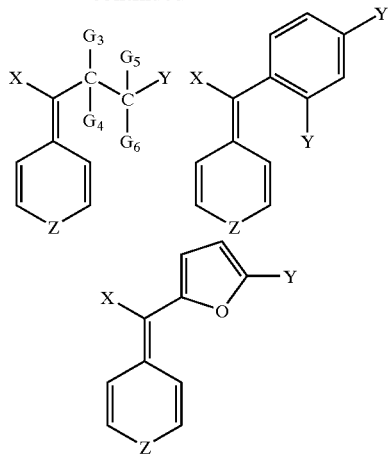

wherein each of $G_1$ to $G_6$ is an optional substituent or an alkyl chain which may be substituted, and each of X and Y is an electro-withdrawing group.

In the above formula [II], the ring A is a carbocyclic ketone structure or a heterocyclic ketone structure formed together with >C=O. The carbocyclic ketone or the heterocyclic ketone is a saturated or aromatic ring type ring having —$CH_2$— or =CH— replaced with >C=O. Further, there may be a plurality of >C=O, >C=S, >C=NH or the like in the cyclic structure of the ring A as shown by a dotted line.

The carbocyclic ketone structure or the heterocyclic ketone structure formed by the ring A may be saturated or unsaturated, and the number of members in the ring is not particularly limited. Further, in the case of a heterocyclic ring, the number of hetero atoms is not particularly limited. Further, the hydrogen atom in the hydrocarbon group in the ring or in —NH— constituting the ring may be substituted with an optional substituent (particularly preferably an alkyl group or an aryl group).

Such a carbocyclic ketone structure or heterocyclic ketone structure may form a condensed ring structure by condensation of an additional ring to part of the ring. The ring structure to be condensed with the cyclic ketone structure may be either carbocyclic ring or heterocyclic ring, but is preferably a benzene ring or a 5- or 6-membered heteroaromatic ring.

Structures of the cyclic ketone are shown below.

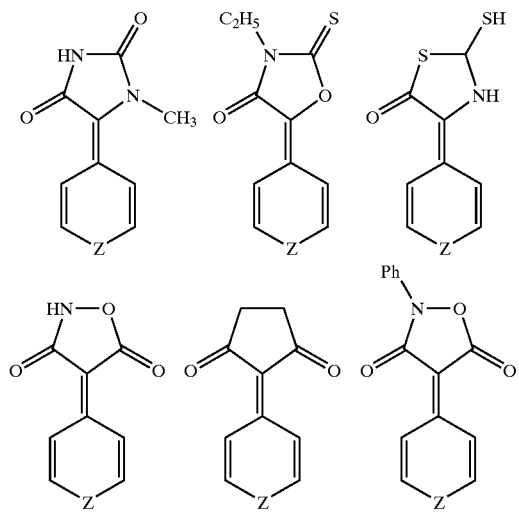

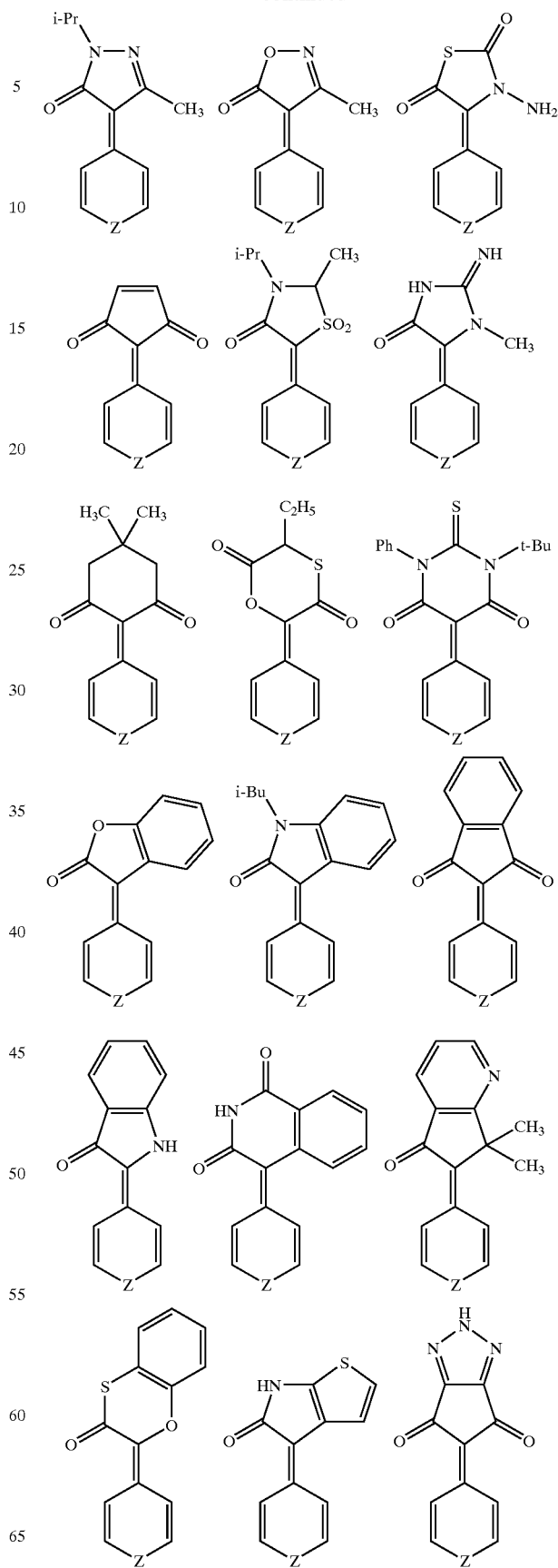

Preferred as the carbocyclic ketone structure and the aromatic ketone structure formed by the ring A are a 5- or 6-membered saturated hydrocarbon ring, and a 5- or 6-membered saturated or unsaturated heterocyclic ring.

The compounds of the formulae [I] and [II] are compounds having a molecular weight of preferably at most 1,000, particularly preferably at most 700.

Further, the present inventors have conducted extensive studies on compounds having novel structures, which have not conventionally been known, and as a result, have found a novel compound having excellent performances as a recording material, i.e. a novel compound of the following formula [I'].

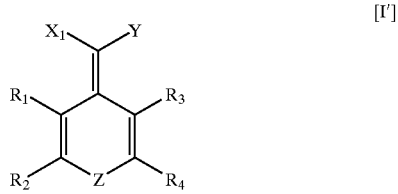

wherein each of $R_1$ to $R_4$ is a hydrogen atom or an optional substituent, provided that $R_1$ and $R_2$, and $R_3$ and $R_4$, may independently be bonded to form a hydrocarbon ring or a heterocyclic ring structure, and the hydrocarbon ring and the heterocyclic ring may have a substituent; each of $X_1$ and Y is an electro-withdrawing group, provided that one of $X_1$ and Y is a cyano group, and the other is —$COOR_{11}$ (wherein $R_{11}$ is a hydrogen atom, a hydrocarbon group which may be substituted or a heterocyclic group which may be substituted) or —$SO_2R_{17}$ (wherein $R_{17}$ is a hydrocarbon group which may be substituted or a heterocyclic group which may be substituted); and Z is —$NR_5$— (wherein in a case where one of $X_1$ and Y is —$COOR_{11}$, $R_5$ is a $C_{3-18}$ branched alkyl group which may be substituted, a $C_{3-18}$ cyclic alkyl group which may be substituted or a 5- or 6-membered saturated heterocyclic group which may be substituted, and in a case where one of $X_1$ and Y is —$SO_2R_{17}$, $R_5$ is a $C_{1-18}$ linear or branched alkyl group which may be substituted, a $C_{3-18}$ cyclic alkyl group which may be substituted or a 5- or 6-membered saturated heterocyclic group which may be substituted).

The present compound is excellent in film forming property when e.g. dissolved in a solvent to form a coating film, and the coating film is suitable for recording by a laser beam having a short wavelength of from 350 to 530 nm, such being advantageous. Further, it is also excellent in storage stability of the coating film. Accordingly, with the present compound, an optical recording medium for recording/readout corresponding to short wavelength laser can be prepared, and the present compound is very useful as a recording material.

Further, when Z has a nitrogen atom, as compared with other cases (such as a case where Z is an oxygen atom), the molar absorptivity ($\epsilon$) tends to increase, and the absorption spectrum in a solution state and a film state tends to be sharp, and accordingly it is preferred that Z has a structure represented by —$NR_5$—.

In general, it is important for a compound to be used as a recording material to have such a characteristic that when it is coated on a substrate by e.g. spin coating to form a recording layer, it does not crystallize on the substrate. If crystallization takes place, the film may undergo white turbidity, whereby the film will be unsuitable for recording.

When a bulky substituent is introduced into a compound, an effect of preventing such crystallization and an effect of improving the solubility in a solvent will be obtained in general, and accordingly it is preferred to introduce a bulky substituent in the compound to form a recording layer suitable for recording.

Accordingly, with respect to $X_1$ and Y, for example, when one of $X_1$ and Y is a cyano group, the other is preferably a bulky group such as —$COOR_{11}$ (wherein $R_{11}$ is a hydrogen atom, a hydrocarbon group which may be substituted or a heterocyclic group which may be substituted) or —$SO_2R_{17}$ (wherein $R_{17}$ is a hydrogen atom which may be substituted or a heterocyclic group which may be substituted), whereby crystallization is less likely to take place. For example, as disclosed in the following Examples, a combination of a cyano group with an ester group (such as an ethyl ester group) or a combination of a cyano group with a sulfonyl group (such as p-toluenesulfonyl group) may be mentioned.

Particularly, the carbon part in the carboxylate group (—COO—) is in $sp^2$ hybrid orbital and is in a plane, whereas the sulfur part in the sulfonyl group (—$SO_2$) it not in a plane but has a tetrahedron structure, and thus a compound with a sulfonyl group is less likely to crystallize.

$R_5$ is a $C_{1-18}$ linear or branched alkyl group which may be substituted, a $C_{3-18}$ cyclic alkyl group which may be substituted, or a 5- or 6-membered saturated heterocyclic group which may be substituted.

As described above, when a bulky substituent is introduced into a compound, an effect of preventing such crystallization and an effect of improving the solubility in a solvent will be obtained in general, and accordingly, $R_5$ preferably has a bulky group such as a branched alkyl chain or a cyclic compound (such as a cyclic alkyl group or a saturated heterocyclic group), rather than a linear alkyl group, whereby crystallization of the coating film will be prevented and the solubility in a solvent will increase.

Namely, $R_5$ is preferably a $C_{3-18}$ branched alkyl group which may be substituted, a $C_{3-18}$ cyclic alkyl group which may be substituted, or a 5- or 6-membered saturated heterocyclic group which may be substituted.

In summary, particularly preferably, in a case where one of $X_1$ and Y is —$COOR_{11}$, $R_5$ is a $C_{3-18}$ branched alkyl group which may be substituted, a $C_{3-18}$ cyclic alkyl group which may be substituted, or a 5- or 6-membered saturated heterocyclic group which may be substituted, and in a case where one of $X_1$ and Y is —$SO_2R_{17}$, $R_5$ is a $C_{1-18}$ linear or branched alkyl group which may be substituted, a $C_{3-18}$ cyclic alkyl group which may be substituted, or a 5- or 6-membered saturated heterocyclic group which may be substituted.

Most preferably, $R_5$ is a $C_{3-12}$ branched alkyl group which may be substituted, a $C_{3-8}$ cyclic alkyl group which may be substituted or a 5- or 6-membered saturated heterocyclic group which may be substituted.

As preferred examples of the compounds of the formulae [I] and [II], the following compounds are mentioned. In the structural formulae of the present specification, Et means ethyl, Bu means butyl and Ph means phenyl.

(1) 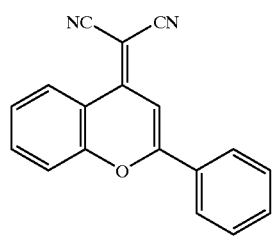
(2) 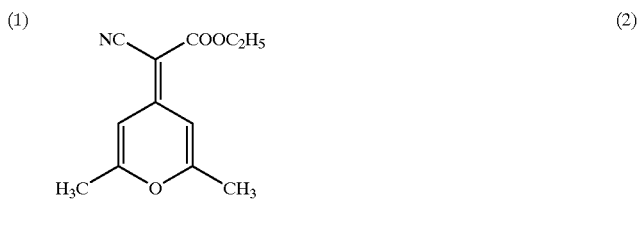
(3) 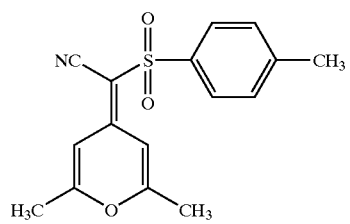
(4) 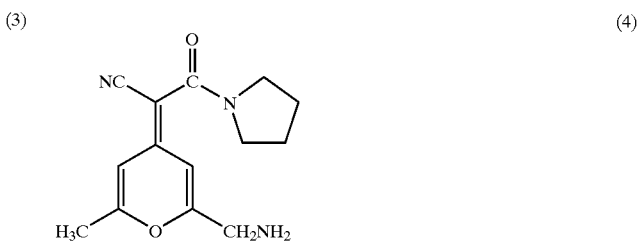
(5) 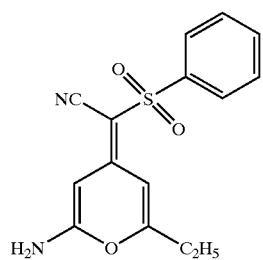
(6) 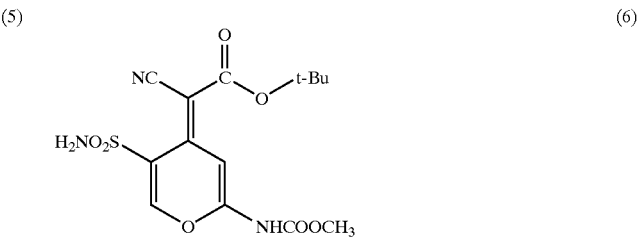
(7) 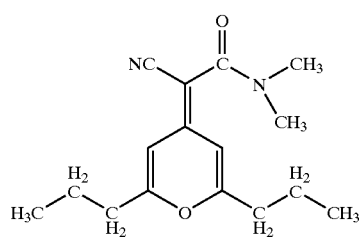
(8) 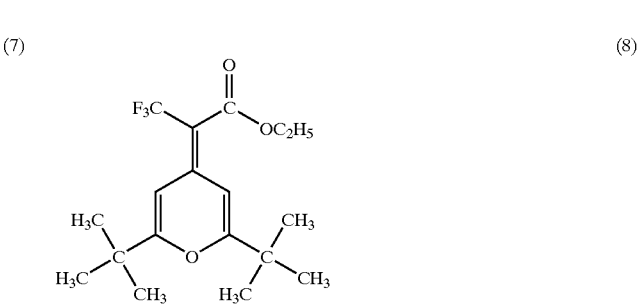
(9) 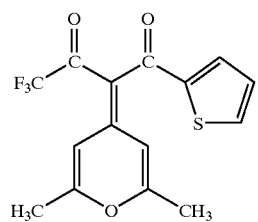
(10) 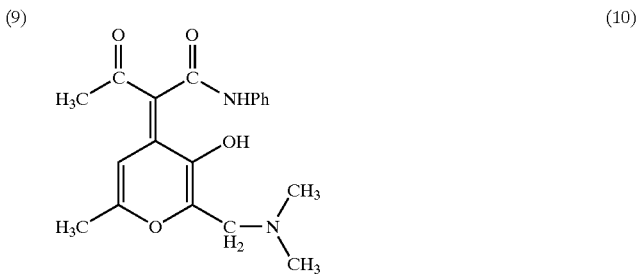
(11) 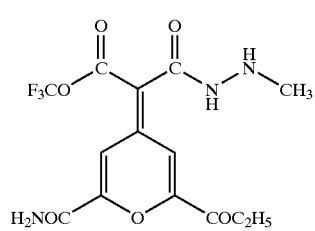
(12) 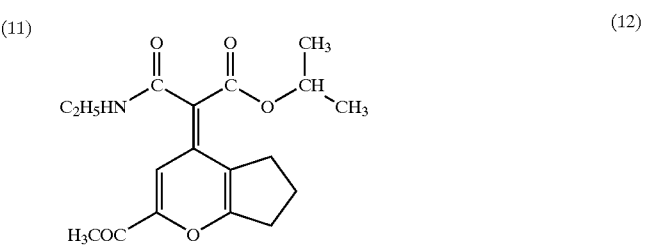

-continued
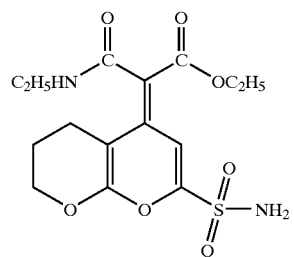
(13)
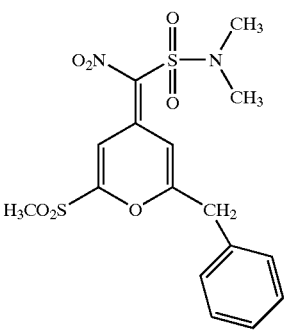
(14)
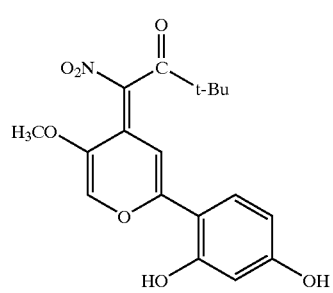
(15)
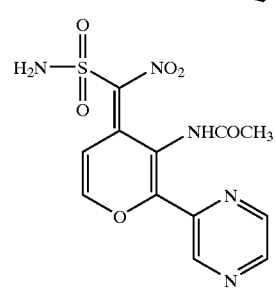
(16)
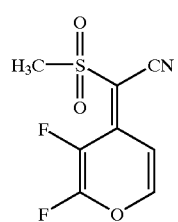
(17)
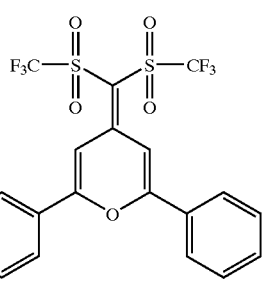
(18)
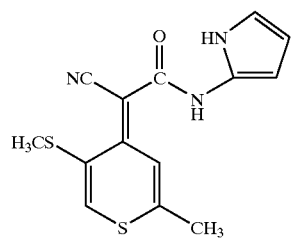
(19)
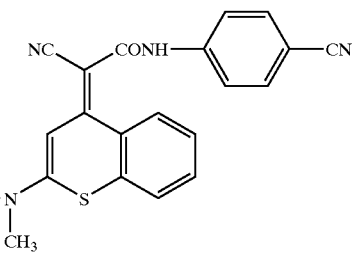
(20)
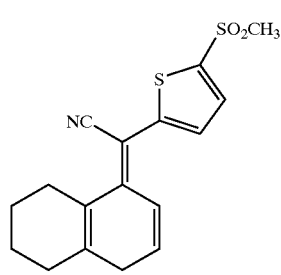
(21)
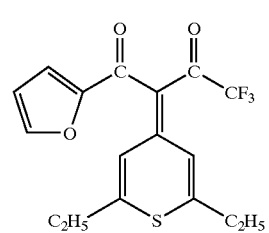
(22)
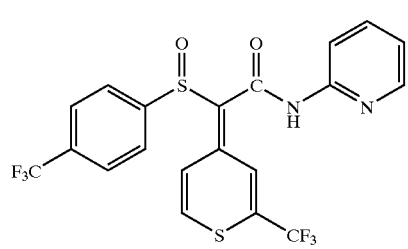
(23)
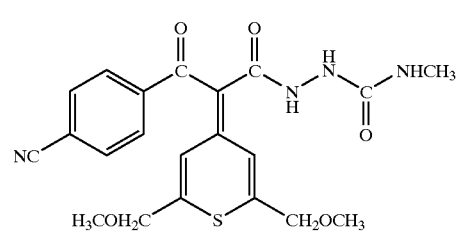
(24)

-continued
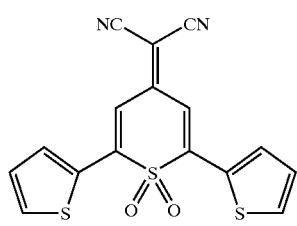 (25)
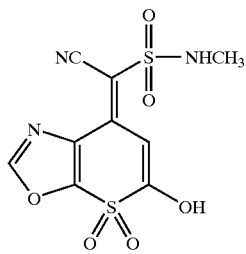 (26)
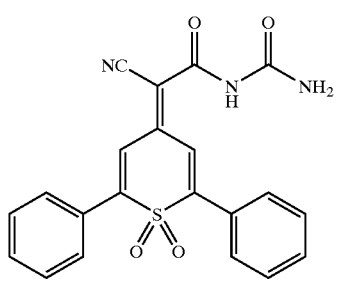 (27)
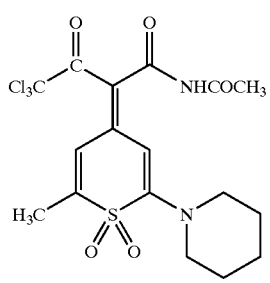 (28)
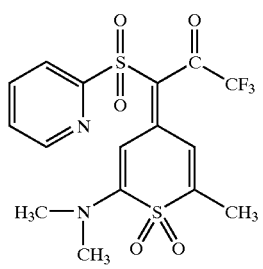 (29)
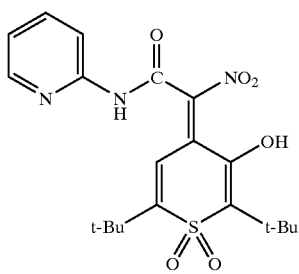 (30)
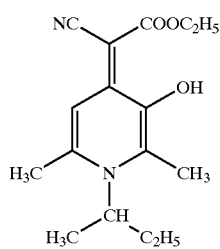 (31)
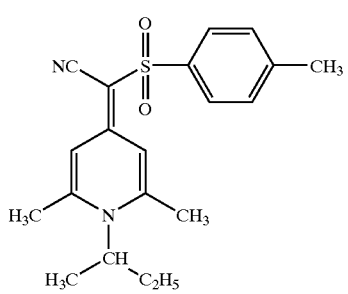 (32)
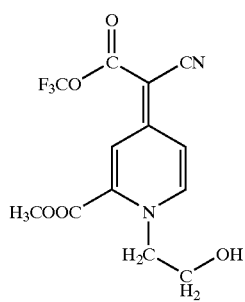 (33)
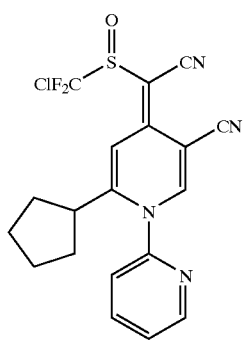 (34)

-continued
(35) 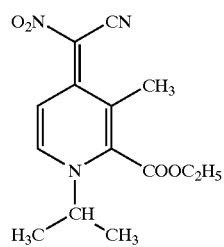
(36) 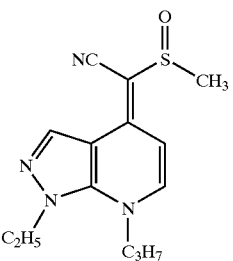
(37) 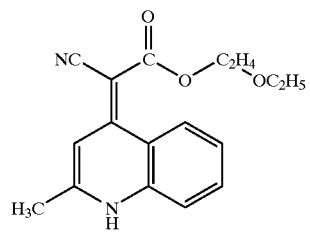
(38) 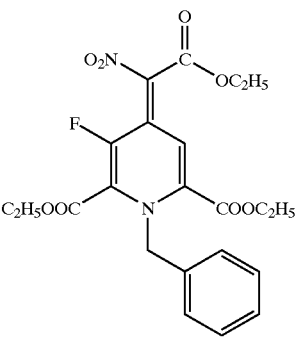
(39) 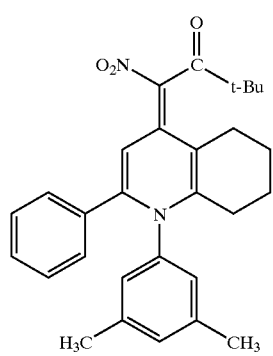
(40) 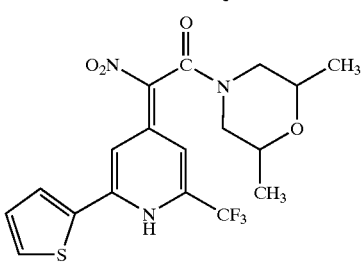
(41) 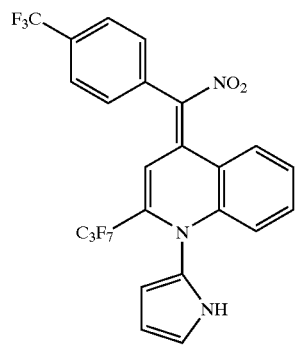
(42) 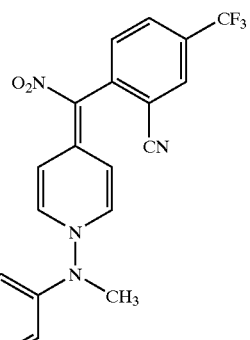
(43) 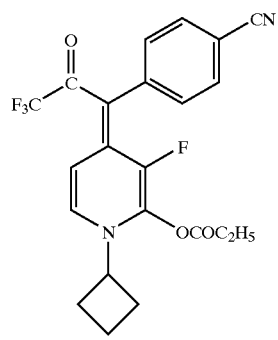
(44) 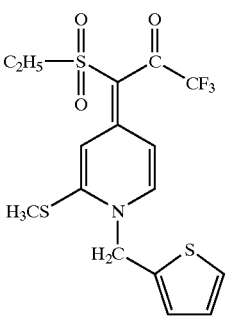

-continued
(45)
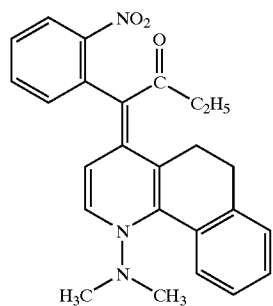
(46)
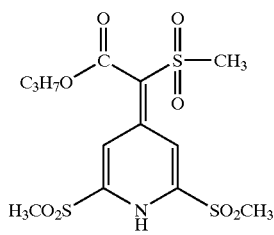
(47)
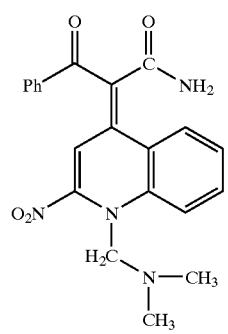
(48)
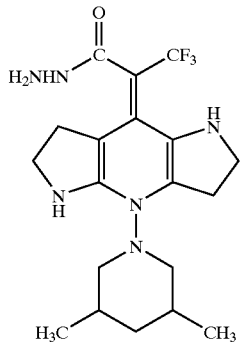
(49)
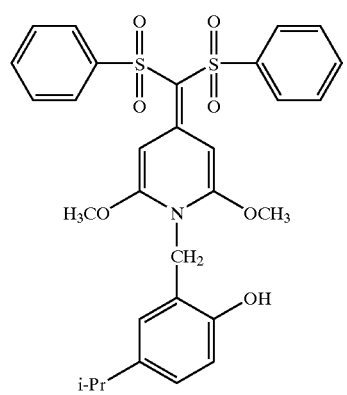
(50)
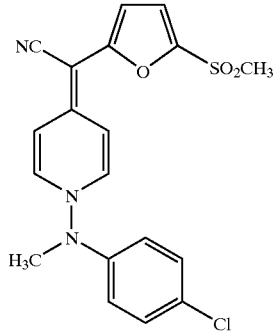
(51)
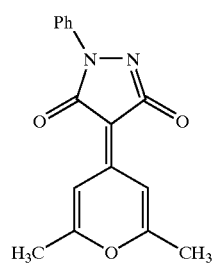
(52)
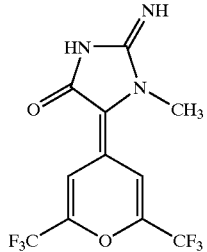
(53)
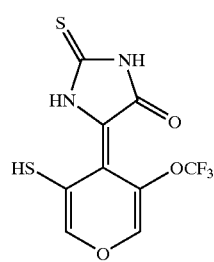
(54)
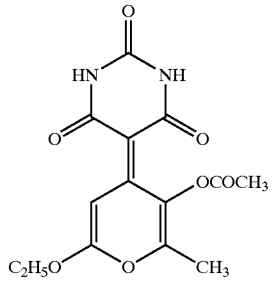

-continued
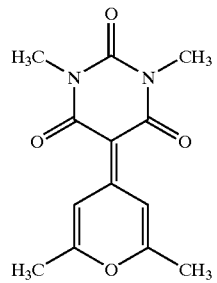
(54)
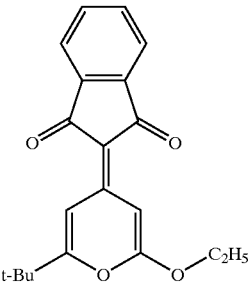
(55)
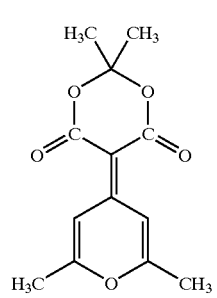
(56)
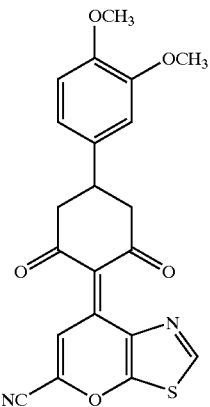
(57)
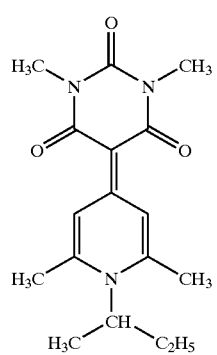
(58)
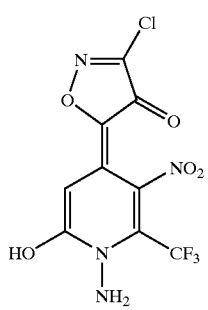
(59)
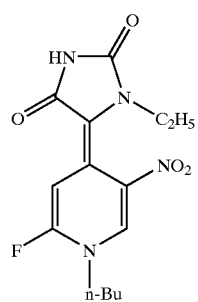
(60)
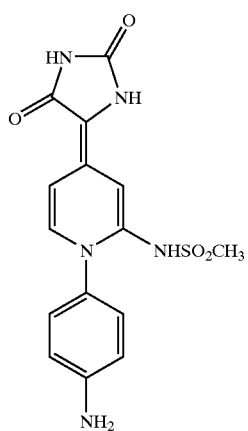
(61)

-continued
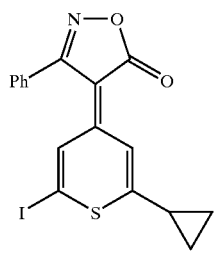 (63)
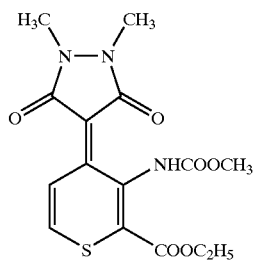 (64)
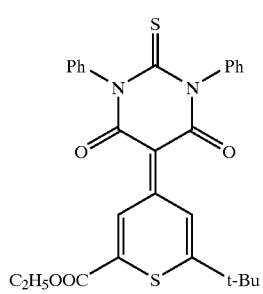 (65)
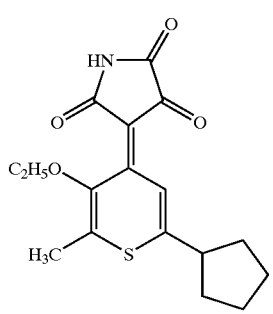 (66)
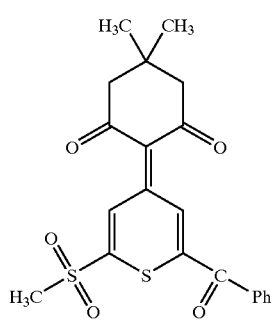 (67)
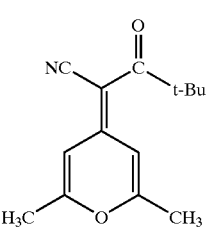 (68)
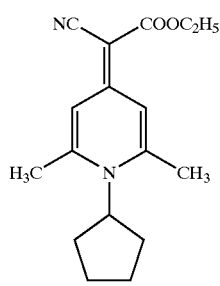 (69)
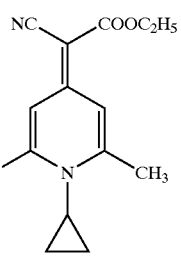 (70)
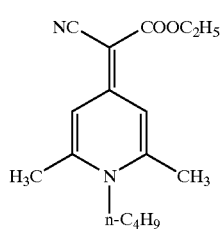 (71)
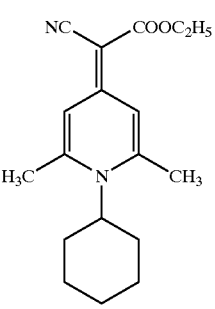 (72)

-continued
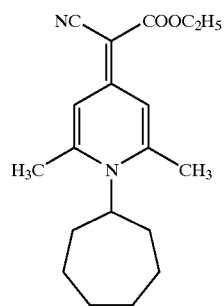
(73)
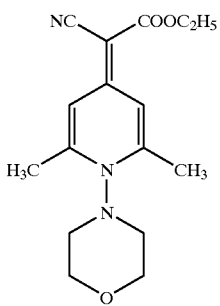
(74)
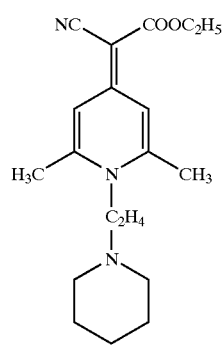
(75)
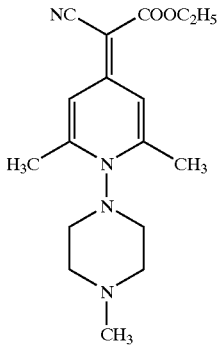
(76)
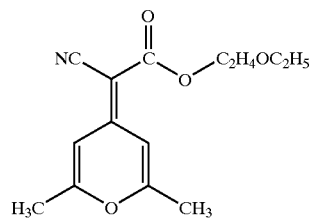
(77)
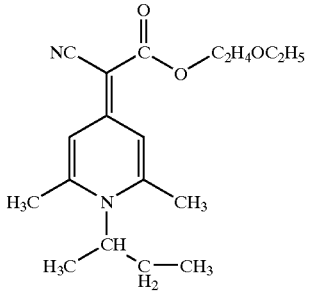
(78)
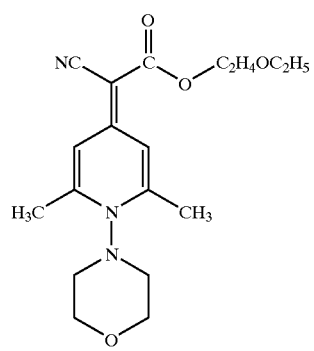
(79)
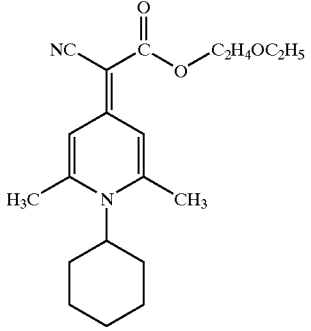
(80)
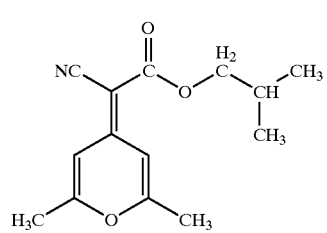
(81)
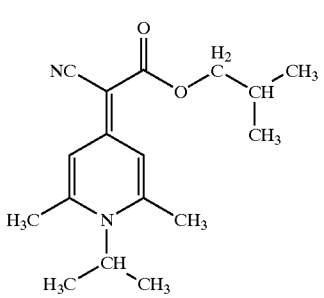
(82)

-continued
(83) 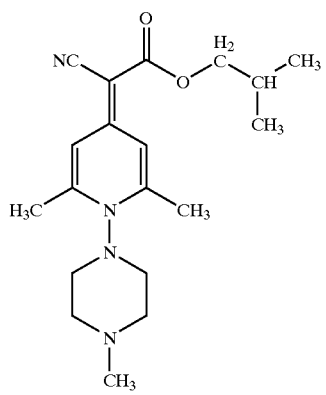
(84) 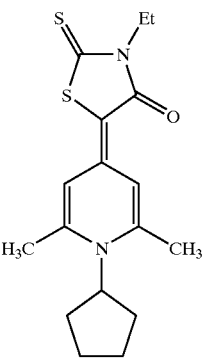
(85) 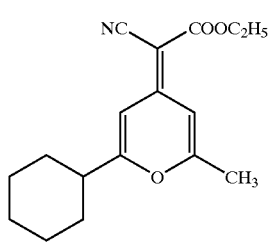
(86) 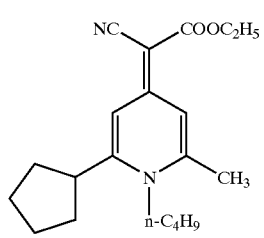
(87)
(88)
(89)
(90)
(91) 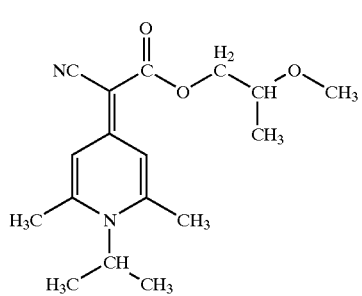
(92) 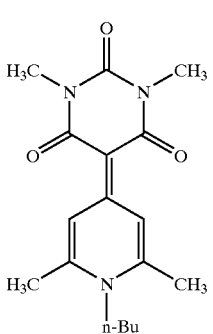

-continued
(93) 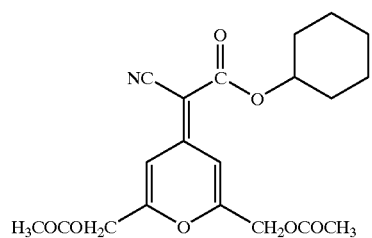
(94) 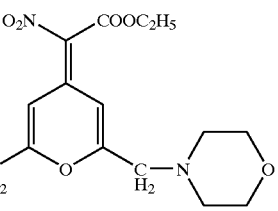
(95) 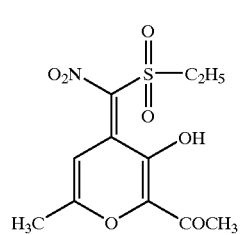
(96) 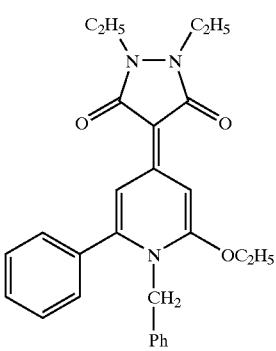
(97) 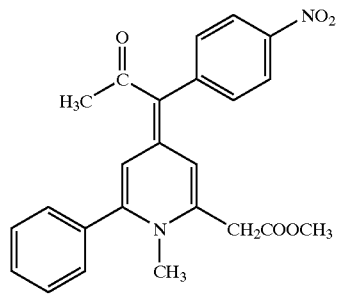
(98) 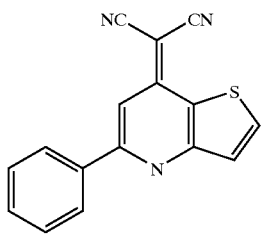
(99) 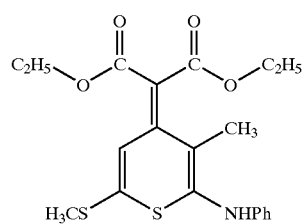
(100) 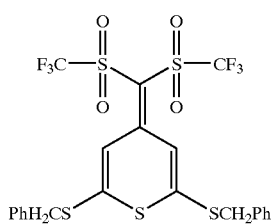
(101) 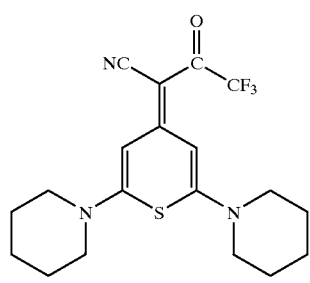
(102) 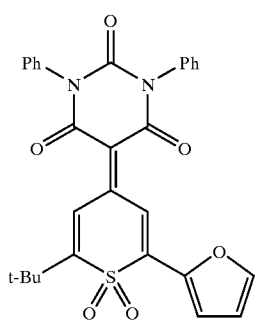

-continued (103)

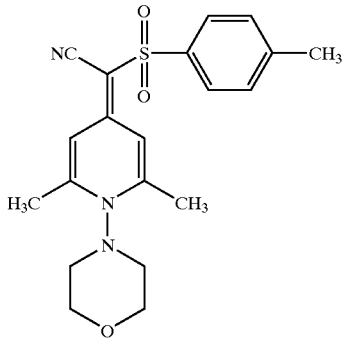

A dye comprising the compound of the above formula [I] or [II] of the present invention is excellent in thin film forming property when a recording layer is formed from a solution containing said dye for example, and is very useful as a dye used for a recording layer of an optical recording medium. Further, the dye of the present invention is very useful as a dye to be used for an optical recording medium for recording/readout corresponding to short wavelength laser, since a recording layer containing said dye has strong absorption suitable for recording/readout by a laser beam in a shorter wavelength (350 nm to 500 nm) region.

Here, compounds which may be used for a recording layer of the optical recording medium of the present invention preferably have excellent optical characteristics for recording/readout by using blue semiconductor laser, such that many of maximum absorption wavelengths (λmax) when the compound is formed into a thin film are in a relatively short wavelength region of from about 320 to about 420 nm, particularly from about 320 to about 400 nm, the peak shape of the absorption spectrum is relatively sharp, the molar absorptivity ε is at least 15,000, etc. Here, the maximum absorption wavelength is a maximum absorption wavelength at a wavelength of over 300 nm in general. Depending upon the shape of the absorption spectrum, there may be two or more maximum absorption wavelengths.

More preferably, the compound satisfies that the optical density OD in a solution state is at least 80, solvility in a harmless and low cost solvent (such as methyl lactate or ethyl lactate) which is commonly used is high, a high quality film is formed at the time of thin film formation (the compound does not crystallize at the time of film formation), storage stability and light resistance are good in a solution state and in a thin film state, etc.

Further, the recording layer of the optical recording medium of the present invention preferably has an extinction coefficient (the imaginary part of the complex index of refraction) k of preferably from 0 to 0.20 at a wavelength of a laser beam for recording and readout. Further, it has a refractivity (the real part of the complex index of refraction) n of at least 1.8.

Now, the optical recording medium of the present invention will be explained in detail below.

The optical recording medium of the present invention is constituted of at least a substrate and a recording layer containing the compound of the above formula [I] or [II]. Further, as the case requires, an under coat layer, a reflective layer, a protective layer, etc. may further be formed.

As one example of a preferred layer constitution, a medium having a high reflectivity, obtained by forming a recording layer on a substrate, and further laminating a reflective layer and a protective layer in this order thereon may be mentioned. In such a case, recording/readout of information is carried out by irradiating the medium with a laser beam from the substrate side (Medium Structure Example 1).

Now, the optical recording medium of the present invention will be explained with reference to a medium of such a structure (Medium Structure Example 1). Here, in the following description, for convenience in explanation, the side on which a protective layer is present and the side on which a substrate is present at the time of lamination are considered to be above and below respectively, and the sides of each layer corresponding to this direction are respectively referred to as the upside surface and the downside surface of each layer.

For the substrate in the optical recording medium of the present invention, basically various materials may be used so long as they are transparent materials at a wavelength of a laser beam for recording and a laser beam for readout. Specifically, a substrate made of a resin such as an acryl type resin, a methacryl type resin, a polycarbonate resin, a polyolefin type resin (particularly an amorphous polyolefin), a polyester type resin, a polystyrene resin or an epoxy resin, a substrate made of glass, or a substrate comprising glass and a resin layer made of a radiation-curing resin such as a photo-setting resin formed on the glass, may, for example, be mentioned.

Particularly, a substrate made of an injection-molded polycarbonate is preferred in view of high productivity, cost, moisture-absorption resistance, etc. Further, in view of chemical resistance, moisture-absorption resistance, etc., a substrate made of an amorphous polyolefin is preferred. Further, in view of high-speed response, etc., a substrate made of glass is preferred.

In a case where a substrate made of a resin is used, or in a case where a substrate having a resin layer formed on a side to be in contact with the recording layer (upside), guide grooves or pits for a laser beam for recording/readout may be formed on the upside surface of the resin-made substrate or the resin layer. The shape of the guide grooves may be a concentric circle shape on the basis of the center of the optical recording medium or a spiral form. In a case where guide grooves in a spiral form are formed, the groove pitch is preferably at a level of from 0.2 to 1.2 μm.

A recording layer containing the compound of the above formula [I] or [II] is formed directly on the upside of the substrate or on the upside of an under coat layer or the like formed on the substrate as the case requires. As a method for forming the recording layer, conventionally conducted thin film forming method such as a vacuum deposition method, a sputtering method, a doctor blade method, a cast method, a spin coating method (a spinner method) or a dipping method may be mentioned. A spin coating method is preferred in view of mass productivity and cost, and a vacuum deposition method is more preferred than a coating method from such a viewpoint that a recording layer having a uniform thickness can be obtained. In the case of film formation by a spin coating method, the number of rotation is preferably from 500 to 15,000 rpm. Further, after spin coating, heating or exposure to vapor of a solvent may be carried out as the case requires.

In a case where a recording layer is formed by a coating method such as a doctor blade method, a cast method, a spin coating method or a dipping method, a coating solvent used to dissolve the compound of the above formula [I] or [II] for coating on the substrate is not particularly limited so long as it is a solvent which does not erode the substrate. Specifically, it may, for example, be a ketone alcohol type solvent such as diacetone alcohol or 3-hydroxy-3-methyl-2-butanone; a cellosolve type solvent such as methyl cellosolve or ethyl cellosolve; a chain hydrocarbon type solvent such as n-hexane or n-octane; a cyclic hydrocarbon type solvent such as cyclohexane, methylcyclohexane, ethylcyclohexane, dimethylcyclohexane, n-butylcyclohexane, tert-butylcyclohexane or cyclooctane; a perfluoroalkyl alcohol type solvent such as tetrafluoropropanol, octafluoropentanol or hexafluorobutanol; or a hydroxycarboxylate type solvent such as methyl lactate, ethyl lactate or methyl 2-hydroxyisobutylate.

In the case of the vacuum deposition method, the compound of the above formula [I] or [II] and as the case requires, another dye or a recording layer component such as an additive is put in a crucible installed in the inside of a vacuum container, the inside of the vacuum container is evacuated to a level of from $10^{-2}$ to $10^{-5}$ Pa by an appropriate vacuum pump, then the crucible is heated so that the recording layer component is evaporated and deposited on a substrate which is disposed to face the crucible, to form a recording layer.

Further, for the purpose of improving stability or light resistance, e.g. a transition metal chelate compound (such as acetylacetonate chelate, bisphenyldithiol, salicylaldehyde oxime or bisdithio-α-diketone) may be incorporated as a singlet oxygen quencher, or for the purpose of improving recording sensitivity, a recording sensitivity improving agent such as a metal type compound may be incorporated into the recording layer in addition to the compound of the above formula [I] or [II]. Here, the metal type compound may be a compound having a metal such as a transition metal contained therein in a form of an atom, an ion or a cluster, and examples of which include organic metal compounds such as an ethylene diamine type complex, an azomethine type complex, a phenylhydroxyamine type complex, a phenanthroline type complex, a dihydroxyazobenzene type complex, a dioxime type complex, a nitrosoaminophenol type complex, a pyridyltriazine type complex, an acetylacetonate type complex, a metallocene type complex and a porphyrin type complex. The metal atom is not particularly limited, but a transition metal is preferred.

Here, for the recording layer, a plural types of the compounds of the above formula [I] or [II] may be used together as the case requires.

Further, as the case requires, another type of dye may be used together with the compound of the above formula [I] or [II] for the recording layer. Said another type of dye is not particularly limited so long as it has an appropriate absorption mainly in the oscillation wavelength region of a laser beam for recording. Further, a dye suitable for recording/readout by using near infrared ray laser having an oscillation wavelength in the wavelength region of from 770 to 830 nm, used for e.g. CD-R, or a dye suitable for recording/readout by using red laser having an oscillation wavelength in the wavelength region of from 620 to 690 nm, used for e.g. DVD-R, may be incorporated in the recording layer together with the compound of the above formula [I] or [II], thereby to produce an optical recording medium corresponding to recording/readout by using a several types of laser beams in different wavelength regions.

Said another type of dye other than the compound of the above formula [I] or [II] may, for example, be a metal-containing azo type dye, a benzophenone type dye, a phthalocyanine type dye, a naphthalocyanine type dye, a cyanine type dye, an azo type dye, a squalilium type dye, a metal-containing indoaniline type dye, a triarylmethane type dye, a merocyanine type dye, an azulenium type dye, a naphthoquinone type dye, an anthraquinone type dye, an indophenol type dye, a xanthene type dye, an oxazine type dye or a pyrylium type dye.

Further, as the case requires, a binder, a leveling agent, an anti-foaming agent, etc., may be used together. Preferred as a binder may, for example, be polyvinyl alcohol, polyvinyl pyrrolidone, nitrocellulose, cellulose acetate, a ketone type resin, an acryl type resin, a polystyrene type resin, a urethane type resin, polyvinyl butyral, polycarbonate or polyolefin.

The thickness of the recording layer is not particularly limited since the suitable film thickness varies depending upon e.g. the recording method, however, a certain extent of film thickness is required for recording, and accordingly it is usually at least 1 nm, preferably at least 5 nm. However, recording may not favorably be carried out if the recording layer is too thick, and accordingly it is usually at most 300 nm, preferably at most 200 nm, more preferably at most 100 nm.

On the recording layer, a reflective layer is formed. Its film thickness is preferably from 50 to 300 nm.

As the material for the reflective layer, a material having an adequately high reflectivity at the wavelength of a laser beam for readout, for example, a metal such as Au, Al, Ag, Cu, Ti, Cr, Ni, Pt, Ta or Pd may be used alone or as an alloy. Among them, Au, Al and Ag have a high reflectivity, and are suitable as a material for the reflective layer. Further, one comprising such a metal as main component and having another material incorporated may also be mentioned. Here, the main component means a content of at least 50%. Said another material other than the main component may, for example, be a metal or a semimetal such as Mg, Se, Hf, V, Nb, Ru, W, Mn, Re, Fe, Co, Rh, Ir, Cu, Zn, Cd, Ga, In, Si, Ge, Te, Pb, Po, Sn, Bi, Ta, Ti, Pt, Pd or Nd. Particularly preferred is one containing Ag as the main component, in such a viewpoint that the cost is low, a high reflectivity is likely to be obtained, and in a case where a print-receiving layer is formed as mentioned hereinafter, a beautiful one, the base color of which is white, can be obtained. For example, an alloy comprising Ag and at least one member selected from Au, Pd, Pt, Cu and Nd incorporated in an amount at a level of from 0.1 to 5 atomic % has a high reflectivity, a high durability and a high sensitivity, is produced at a low cost, and is thereby preferred. Specifically, a AgPdCu alloy, a AgCuAu alloy, a AgCuAuNd alloy, a AgAuNd alloy or a AgCuNd alloy may, for example, be mentioned. As a material other than a metal, a low refractive index thin film and a high refractive index thin film may alternately be laminated one on the other to form a multilayer film, which is used as a reflective layer.

As the method of forming a reflective layer, a sputtering method, an ion plating method, a chemical deposition method or a vacuum deposition method may, for example, be mentioned. Further, a known inorganic or organic interlayer or adhesive layer may be formed on the substrate or below the reflective layer with a purpose of increasing the reflectivity, improving recording characteristics or increasing adhesive properties.

The material of the protective layer to be formed on the reflective layer is not particularly limited so long as the reflective layer is protected from external force. As the material of an organic substance, a thermoplastic resin, a thermosetting resin, an electron radiation curing resin or a UV curing resin may, for example, be mentioned. Further, as an inorganic substance, silicon dioxide, silicon nitride, $MgF_2$ or $SnO_2$ may, for example, be mentioned.

In a case where a thermoplastic resin, a thermosetting resin or the like is used, it may be dissolved in a proper solvent, and a coating liquid thus obtained may be coated on the reflective layer, followed by drying, whereby a protective layer is formed. In a case where a UV curing resin is used, it is coated as it is or a coating liquid prepared by dissolving the resin in a proper solvent is coated on the reflective layer, followed by irradiation with UV light for curing, whereby a protective layer is formed. As the UV curing resin, an acrylate type resin such as urethane acrylate, epoxy acrylate or polyester acrylate may, for example, be used. These materials may be used alone or as a mixture of several types. Further, the protective layer may be formed as a single layer or as a multilayer.

As a method of forming the protective layer, similar to the recording layer, a coating method such as a spin coating method or a cast method, a sputtering method or a chemical vapor deposition method may, for example, be used, and among them, a spin coating method is preferred. The thickness of the protective layer is usually at least 0.1 $\mu$m, preferably at least 3 $\mu$m, since a certain extent of thickness is required to obtain its protective function. However, if it is too thick, not only no higher effect will be obtained but also there is fear that formation of the protective layer may take long or the cost tends to be high, and accordingly it is usually at most 100 $\mu$m, preferably at most 30 $\mu$m.

The layer structure of the optical recording medium has been explained above with reference to the structure comprising a substrate, a recording layer, a reflective layer and a protective layer laminated in this order. However, as described above, another layer structure may be employed.

For example, when an adequate reflectivity against laser beam for recording or a laser beam for readout can be obtained in a constitution without a reflective layer, it is preferred that no reflective layer is formed, whereby such a merit is obtained that the costs of the material and formation for the reflective layer can be reduced. Accordingly, a medium can be produced at a low cost by forming the recording layer and the protective layer by a coating method such as a spin coating method without employing a sputtering method.

Further, for example, another substrate may further be bonded to the upside surface of the protective layer in the layer structure of the above example or to the upside surface of the reflective layer in the layer structure of the above example without a protective layer. In this case, the substrate may be a substrate itself without any layer formed thereon, or may have an optional layer such as a reflective layer on the bonding side or on the opposite side. Further, two optical recording media having the layer structure of the above example or optical recording media having a layer structure of the above example without a protective layer, may be bonded so that the upside surfaces of the protective layer and/or the reflective layer of these media face each other.

Further, as one example of the preferred layer constitution of the optical recording medium of the present invention, a medium comprising a substrate, a reflective layer formed on the substrate, and a recording layer and a protective coating further laminated in this order thereon, may be mentioned. In such a case, recording/readout of information is carried out by irradiation with a laser beam through the protective coating (Medium Structure Example 2).

As the protective coating, a film or a sheet-form product may be bonded by means of an adhesive, or the same material as for the above protective layer may be used, and a coating liquid for film formation is coated, followed by curing or drying to form the protective coating. The thickness of the protective coating is usually at least 0.1 $\mu$m, preferably at least 3 $\mu$m, since a certain extent of thickness is required to obtain its protective function. However, if it is too thick, not only no higher effect will be obtained, but also there is fear that the protective layer formation may take long or the cost tends to be high, and accordingly it is usually at most 300 $\mu$m, preferably at most 200 $\mu$m.

In such a layer constitution also, as each of the recording layer and the reflective layer, the same layer as in the above Medium Structure Example 1 is used in general. However, in the present layer constitution, the substrate is not necessarily transparent, and accordingly a substrate comprising an opaque resin, a ceramic or a metal (including an alloy) may be employed in addition to the above-described materials.

In such a layer constitution also, there may be an optional layer between layers, as the case requires, within a range of not impairing characteristics of the present invention.

Here, as one means to increase the recording density of the optical recording medium, increase in the numerical aperture of an object lens may be mentioned, whereby beam spot condensed on the surface on which information is recorded can be micrified. However, if the numerical aperture of an object lens is increased, when the optical recording medium is irradiated with a laser beam for recording/readout, the aberration of the beam spot due to e.g. warpage of the optical recording medium tends to be significant, whereby no favorable signals for recording/readout may be obtained stably in some cases.

Such an aberration tends to be significant when the transparent substrate or the protective coating through which a laser beam is transmitted is thick, and it is preferred to make the substrate or the protective coating as thin as possible, in order to decrease the aberration. However, a certain extent of the substrate thickness is required so as to secure the strength of the optical recording medium in general, and in this case, it is preferred to employ Medium Structure Example 2 (an optical recording medium having a basic layer constitution comprising a substrate, a reflective layer, a recording layer and a thin protective coating). The protective coating of Medium Structure Example 2 is easily made thin as compared with the substrate in Medium Structure Example 1, and thus Medium Structure Example 2 is preferably employed.

In Medium Structure Example 2 also, when an adequate reflectivity against a laser beam for recording or a laser beam for readout can be obtained with a constitution without a reflective layer, it is preferred that no reflective layer is formed, whereby such a merit is obtained that the costs of the material and film formation for the reflective layer can be reduced. Accordingly, a medium can be produced at a low cost by forming the recording layer and the protective layer by a coating method such as a spin coating method without employing a sputtering method.

However, even in Medium Structure Example 1 (an optical recording medium having a basic layer constitution comprising a transparent substrate, a recording layer, a reflective layer and a protective layer), by decreasing the thickness of the transparent substrate through which laser beams for recording/readout pass to a level of from 50 to 300 µm, the aberration can be decreased so that the optical recording medium of Medium Structure Example 1 can be used.

Further, after formation of each of the other layers, an ultraviolet-curing resin layer or an inorganic type thin film may, for example, be formed on the plane of incidence of a laser beam for recording/readout (usually on the downside surface of the substrate), with a purpose of protecting the surface or preventing attachment of dust, etc., and a print-receiving layer on which writing or printing can be carried out by using an inkjet, thermal transfer or other printer or by a writing material, on the side opposite to the plane of incidence of a laser beam for recording/readout (usually on the upside surface of the reflective layer or the protective layer in general).

The laser beam used for recording/readout of information for the optical recording medium of the present invention preferably has a wavelength as short as possible from such a viewpoint to realize a high density recording, and particularly preferred is a laser beam having a wavelength of from 350 to 530 nm. As representative examples of such a laser beam, laser beams having center wavelengths of 405 nm, 410 nm and 515 nm may be mentioned.

A laser beam having a wavelength of from 350 to 530 nm can be obtained by using a high output semiconductor laser of blue color of 405 nm or 410 nm or blue green color of 515 nm. In addition, it may be obtained, for example, by wavelength conversion of an oscillation laser beam of either (a) semiconductor laser capable of continuous oscillation having a basic oscillation wavelength of from 740 to 960 nm, or (b) solid laser capable of continuous oscillation with a basic oscillation wavelength of from 740 to 960 nm, to be excited by semiconductor laser, by a second harmonic generation element (SHG).

The above SHG may be any one so long as it is a piezo element which lacks inversion symmetry, and preferred is KDP, ADP, BNN, KN, LBO, a compound semiconductor, etc. Specific examples of the second harmonic include, in a case of semiconductor laser having a basic oscillation wavelength of 860 nm, 430 nm as a double harmonic to the basic oscillation wavelength, and in a case of solid laser excited by semiconductor laser, 430 nm as a double harmonic from a LiSrAlF$_6$ crystal doped with Cr (basic oscillation wavelength: 860 nm).

In a case where information is recorded on the optical recording medium of the present invention, the recording layer is usually irradiated with a laser beam focused to a level of from 0.4 to 0.6 µm (usually through the substrate from the substrate side). The region of the recording layer irradiated with the laser beam undergoes thermal deformation such as decomposition, heat generation or dissolution by absorbing the energy of the laser beam, whereby its optical characteristics change.

To conduct readout of the recorded information, the recording layer is irradiated with a laser beam having a lower energy (usually from the same direction as recording). Readout of information on the recording layer is conducted by reading a difference between the reflectivity at a region where a change of the optical characteristics takes place (i.e. the region on which information is recorded) and the reflectivity at a region where no change takes place.

Now, the present invention will be explained in further detail with reference to Examples. However, the present invention is by no means restricted to such Examples unless it exceeds its gist.

SYNTHESIS EXAMPLE

A method for synthesizing the compounds of the above formulae [I] and [II] is not particularly limited, but as a common production method, it has been known that they can be obtained by heating a γ-pyrone or γ-thiapyrone compound in a compound having active methylene and acetic anhydride, as disclosed in J.O.C., Vol. 39, No. 7 (1974) p989 or in Arch. der. Pharm. Nr. 4 (1960), p404. Further, by reacting the formed pyrone compound with e.g. ammonia, an aliphatic primary amine, an aromatic amine or hydrazine, a compound wherein Z is —NR$_5$— may be synthesized. Further, a method for synthesizing a compound wherein Z is —SO$_2$— is disclosed in detail in e.g. J.O.C., Vol. 60 (1995) p1665.

Example 1 Compound (1)

(a) Preparation Example

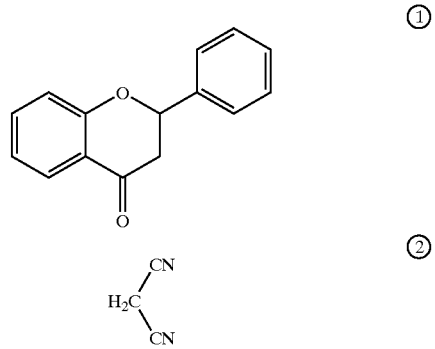

0.67 g (3 mmol) of flavone of the above structural formula ① and 0.6 g (9 mmol) of malononitrile of the above structural formula ② were dissolved in 15 ml of acetic anhydride with stirring, followed by reflux in an oil bath for 32 hours. The obtained reaction solution was cooled and then put in 300 ml of ice water, followed by stirring for 30 minutes to precipitate a solid, which was subjected to filtration and a solid material was collected by filtration. The collected solid was purified by recrystallization from an ethanol solvent to obtain 0.23 g (yield: 28.4%) of the compound (1).

This compound had a λmax in chloroform of 402.5 nm and a molar absorptivity of $2.4 \times 10^4$.

(b) Recording Medium Example

The above compound (1) was dissolved in methyl lactate and adjusted to 1.0 wt %, and this solution was subjected to filtration to obtain a dissolved solution, which was dropped on a substrate made of an injection-molded polycarbonate resin having a diameter of 120 mm and a thickness of 1.2 mm, and coated by a spinner method, followed by drying at 100° C. for 30 minutes. This coating film had a maximum absorption wavelength (λmax) of 395.5 nm.

Evaluation of Optical Recording Medium

On the coating film prepared in Example 1, Ag or the like may be formed by a sputtering method or the like as the case requires to form a reflective layer, and a ultraviolet-curing

Example 2 Compound (51)

(a) Preparation Example

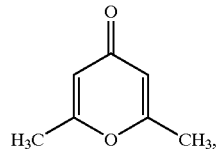
(3)

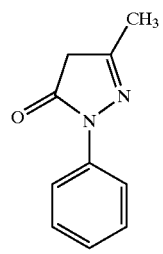
(4)

1.24 g (15 mmol) of 2,6-dimethyl-γ-pyrone of the above structural formula ③ and 2.09 g (12 mmol) of 1-phenyl-3-methyl-5-pyrazolone of the above structural formula ④ were dissolved in 40 ml of acetic anhydride with stirring. Then, this solution was subjected to reflux in an oil bath for 24 hours, cooled and then put in 400 ml of ice water, followed by stirring for 30 minutes, and the precipitate was collected by filtration. The collected substance was suspended in 100 ml of water, followed by stirring for 30 minutes, and then the suspension was subjected to filtration, and the collected substance was further suspended in 20 ml of methanol, followed by washing for purification to obtain 0.34 g (yield: 12%) of the compound (51).

This compound had a λmax in chloroform of 357.5 nm and a molar absorptivity of $2.8 \times 10^4$.

(b) Recording Medium Example

The above compound (51) was dissolved in octafluoropentanol and adjusted to 1.0 wt %, and this solution was subjected to filtration to obtain a dissolved solution, which was dropped on a substrate made of an injection-molded polycarbonate resin having a diameter of 120 mm and a thickness of 1.2 mm, and coated by a spinner method, followed by drying at 100° C. for 30 minutes. This coating film had a maximum absorption wavelength (λmax) of 344 nm.

Evaluation of Optical Recording Medium

On the coating film prepared in Example 2, Ag or the like may be formed by a sputtering method or the like as the case requires to form a reflective layer, and a ultraviolet-curing resin may further be coated by spin coating or the like and cured by irradiation with UV to form a protective layer, thereby to form an optical recording medium. It is evident from the value of λmax of the coating film that on this optical recording medium, recording/readout by semiconductor laser with a center wavelength of 405 nm for example can be carried out.

Example 3 Compound (2)

(a) Preparation Example

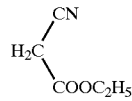
(5)

1.86 g (15 mmol) of the above 2,6-dimethyl-γ-pyrone and 2.04 g (18 mmol) of ethyl cyanoacetate of the above structural formula ⑤ were dissolved in 60 ml of acetic anhydride with stirring. Then, this solution was subjected to reflux in an oil bath for 37 hours, cooled and then put in 600 ml of ice water, followed by stirring for 30 minutes, and the precipitate was collected by filtration. The collected substance was suspended in 100 ml of water, followed by stirring for 1 hour, and the suspension was subjected to filtration, and the collected substance was dried to obtain 1.4 g (yield: 42.7%) of the compound (2).

This compound had a λmax in chloroform of 351 nm and a molar absorptivity of $2.5 \times 10^4$.

(b) Recording Medium Example

The above compound (2) was dissolved in 3-hydroxy-3-methyl-2-butanone and adjusted to 1.0 wt %, and this solution was subjected to filtration to obtain a dissolved solution, which was dropped on a substrate made of an injection-molded polycarbonate resin having a diameter of 120 mm and a thickness of 1.2 mm, and coated by a spinner method, followed by drying at 100° C. for 30 minutes. This coating film had a maximum absorption wavelength (λmax) of 352.5 nm.

Evaluation of Optical Recording Medium

On the coating film prepared in Example 3, Ag or the like may be formed by a sputtering method or the like as the case requires to form a reflective layer, and a ultraviolet-curing resin may further be coated by spin coating or the like and cured by irradiation with UV to form a protective layer, thereby to form an optical recording medium. It is evident from the value of λmax of the coating film that on this optical recording medium, recording/readout by semiconductor laser with a center wavelength of 405 nm for example can be carried out.

Example 4 Compound (31)

(a) Preparation Example

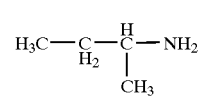
(6)

0.88 g (4 mmol) of the above compound (2) and 8 ml of sec-butylamine of the above structural formula ⑥ were subjected to reflux in an oil bath at 63° C. for 2 hours with stirring. Then, the reaction solution was cooled, 40 ml of water and 60 ml of ethyl acetate were added thereto, followed by stirring, then extraction was carried out, an organic layer was separated, and the solvent was distilled off to obtain 0.76 g (yield: 77%) of the compound (31). This compound had a λmax in chloroform of 375.5 nm and a molar absorptivity of $3.6 \times 10^4$. The absorption spectrum in a chloroform solution (5 mg/l) is shown in FIG. 1.

(b) Recording Medium Example

Figure 2:
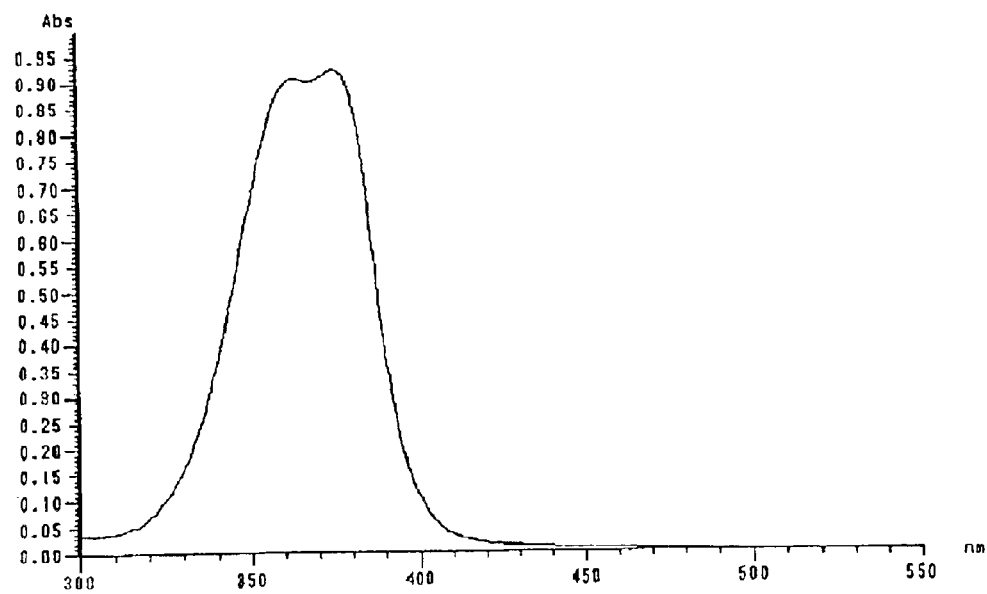
FIG. 2 illustrates an absorption spectrum of a coating film of a dye of the compound (31) synthesized in Example 4.

The above compound (31) was dissolved in octafluoropentanol and adjusted to 1.0 wt %, and this solution was subjected to filtration to obtain a dissolved solution, which was dropped on a substrate made of an injection-molded polycarbonate resin having a diameter of 120 mm and a thickness of 1.2 mm, and coated by a spinner method, followed by drying at 100° C. for 30 minutes. This coating film had a maximum absorption wavelength (λmax) of 373.5 nm. The absorption spectrum of the coating film is shown in FIG. 2.

(c) Preparation Example of Disc for Evaluation

The above compound (31) was dissolved in octafluoropentanol and adjusted to 0.7 wt %. This solution was subjected to filtration to obtain a dissolved solution, which was dropped on a substrate made of an injection-molded polycarbonate resin having a is diameter of 120 mm and a thickness of 0.6 mm, and having grooves with a track pitch of 0.74 μm, a groove width of 0.3 μm and a groove depth of 90 nm, and coated by a spinner method. The coating was carried out by increasing the number of rotations from 600 rpm to 4,900 rpm over a period of 25 seconds and keeping the number of rotations at 4,900 rpm for 5 seconds. Then, drying was carried out at 100° C. for 30 minutes to obtain a recording layer. Then, silver was formed in a thickness of 100 nm by a sputtering method to form a reflective layer. Then, a protective coat agent comprising a UV curing resin was coated by a spinner method, followed by irradiation with UV light to form a protective layer having a thickness of 5 μm. Further, a substrate made of polycarbonate having a thickness of 0.6 mm was attached to the protective layer side by using a delayed-curing type adhesive to prepare a disc for evaluation.

(d) Recording Example

While rotating the disc for evaluation at a linear velocity of 3.5 m/sec, single-frequency signals of 8T mark/8T space were recorded on the grooves with a laser beam having a wavelength of 405 nm (numerical aperture NA of an object lens: 0.65). Here, T is a reference clock period corresponding to a frequency of 26.2 MHz. The recording pulse strategy was in accordance with DVD-R Ver.2 specification, and the number of divided pulses was such that the leading recording pulse width was 2T, the following recording pulse width was 0.6 T, the bias power was 0.2 mW, the readout power was 0.2 mW, and the recording power was variable, where the mark length was nT (n–2). As a result, recording could be carried out at a recording power of at least 4 mW, and signals with a modulated amplitude of 25% could be recorded at 8 mW. The modulated amplitude is considered to be higher by optimizing recording conditions such as pulse strategy.

Examples 5 to 9

In the same method as in the above synthesis method, the compounds (9), (3), (32), (55) and (59) were synthesized, coating films were formed in the same manner as in Examples, and an absorption spectrum of each of the coating films was measured. The maximum absorption wavelength in a solution and the molar absorptivity of each of these compounds and the maximum absorption wavelength of each of the coating films are shown in Table 1 together with the results of Examples 1 to 4.

Figure 3:
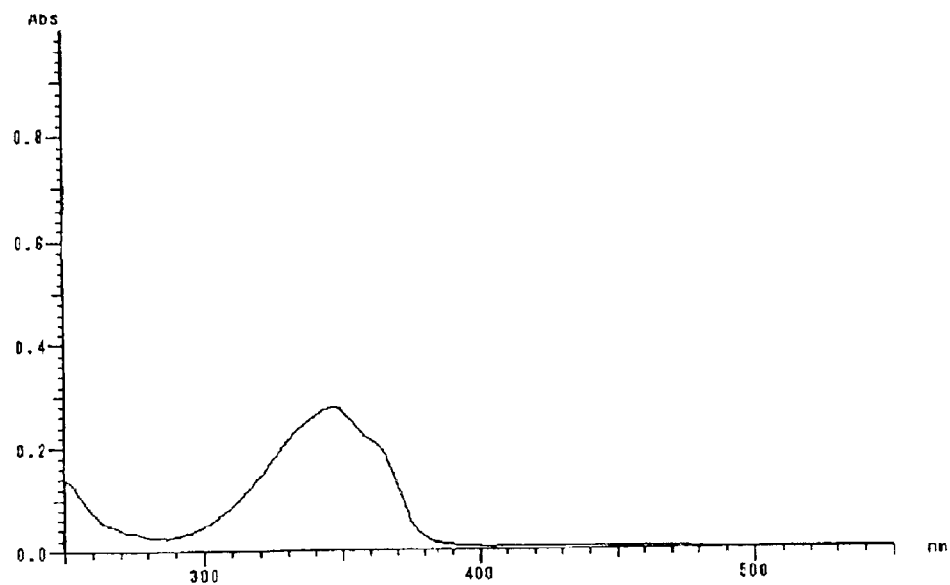
FIG. 3 illustrates an absorption spectrum of a dye of the compound (3) synthesized in Example 6 in a 5 mg/l chloroform solution.
Figure 4:
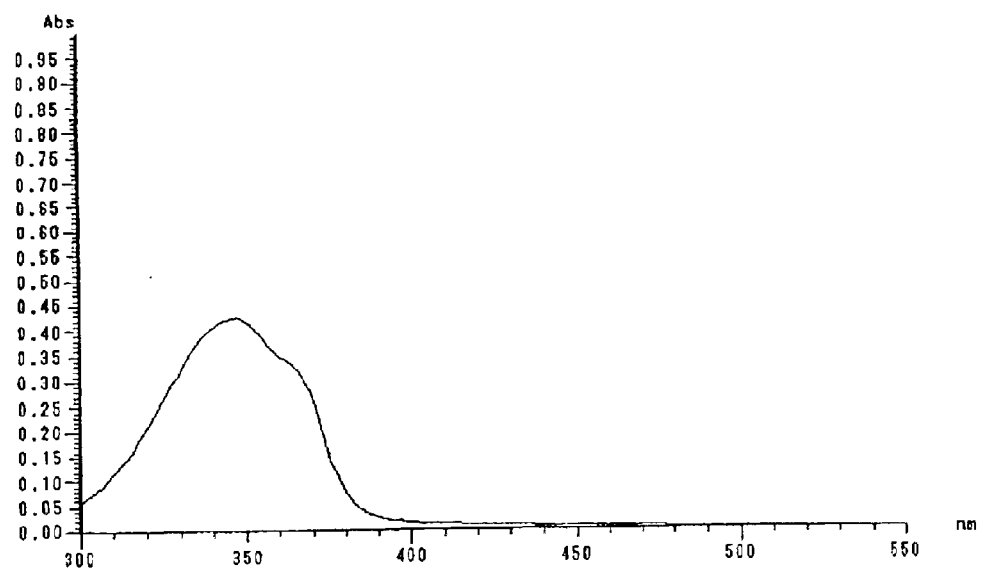
FIG. 4 illustrates an absorption spectrum of a coating film of a dye of the compound (3) synthesized in Example 6.
Figure 5:
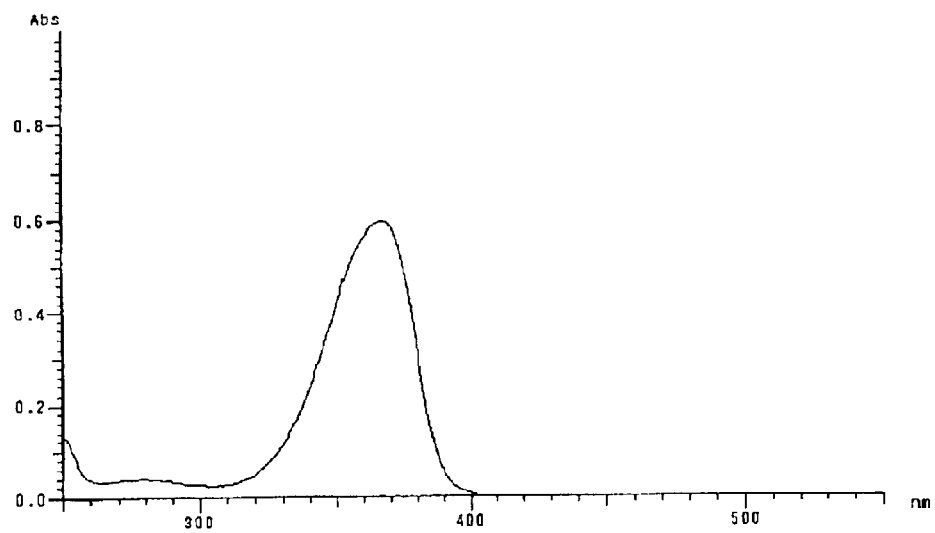
FIG. 5 illustrates an absorption spectrum of a dye of the compound (32) synthesized in Example 7 in a 5 mg/l chloroform solution.
Figure 6:
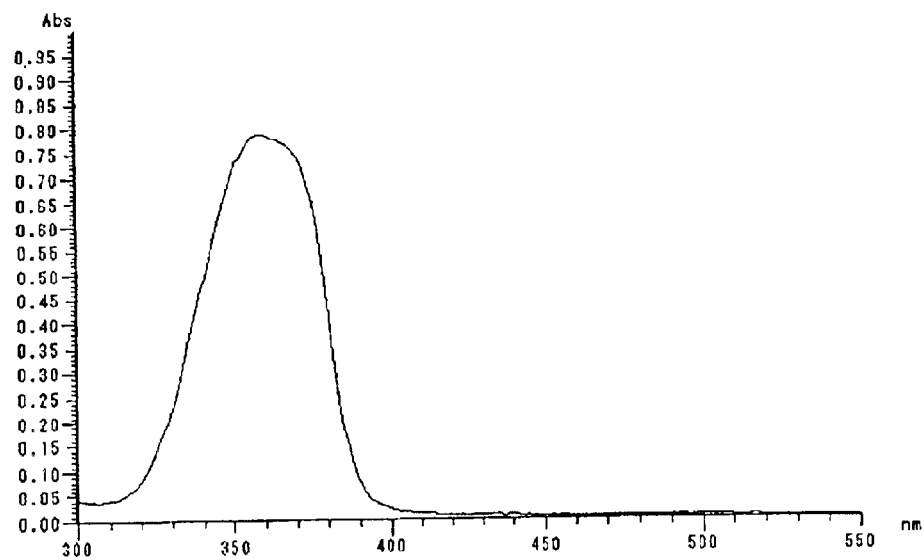
FIG. 6 illustrates an absorption spectrum of a coating film of a dye of the compound (32) synthesized in Example 7.

Further, of the dye of the compound (3) synthesized in Example 6, the absorption spectrum in a 5 mg/l chloroform solution and the absorption spectrum of the coating film are shown in FIGS. 3 and 4, respectively. Of the dye of the compound (32) synthesized in Example 7, the absorption spectrum in a 5 mg/l chloroform solution and the absorption spectrum of the coating film are shown in FIGS. 5 and 6, respectively.

Evaluation of Optical Recording Medium

On each of the coating films prepared in Examples 5 to 9, Ag or the like may be formed by a sputtering method or the like as the case requires to form a reflective layer, and a ultraviolet-curing resin may further be coated by spin coating or the like and cured by irradiation with UV to form a protective layer, thereby to form an optical recording medium. It is evident from the value of λmax of the coating film that on this optical recording medium, recording/readout by semiconductor laser with a center wavelength of 405 nm for example can be carried out.

Example 10 Compound (86)

(a) Preparation Example

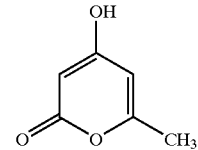

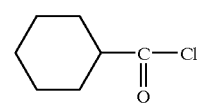

18.9 g (0.15 mol) of 4-hydroxy-6-methyl-2-pyrone of the above formula ⑦ and 25 g (0.17 mol) of cyclohexane carbonyl chloride of the above formula ⑧ were dissolved in 50 ml of a trifluoro acetic acid solution, followed by heating at 100° C. for 6.5 hours. After cooling, the reaction solution was put in 350 ml of water to precipitate a solid, and stirring was continued for 1 hour, and a solid material was collected by filtration. The solid material was suspended in 500 ml of water, followed by stirring for 1 hour, and the solid was collected by filtration, followed by drying under vacuum to obtain 28.9 g (yield: 81.5%) of the compound of the following formula ⑨.

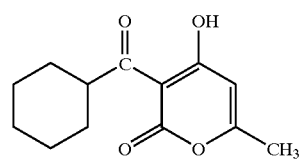

15 g of the compound of the formula ⑨ was dissolved in 200 ml of acetic acid and 100 ml of concentrated hydrochloric acid, followed by heating at 100° C. for 2.5 hours, and after cooling, the solution was put in 250 ml of water, followed by neutralization with ammonia until pH 7 with stirring. 500 ml of toluene was added thereto, a reaction product was separated by extraction, the toluene layer was washed with 250 ml of water twice, sodium sulfate was added thereto, and the toluene layer was left to stand overnight. Then, the toluene layer was subjected to filtration and the filtrate was distilled off to obtain 10.2 g (yield: 83.6%) of the following compound (10).

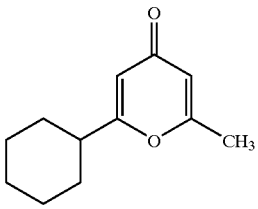

4.8 g (25 mmol) of the obtained compound (10) and 3.39 g (30 mmol) of ethyl cyanoacetate of the above formula (5) were dissolved in 100 ml of acetic anhydride, followed by reflux for 54 hours. After cooling, the reaction solution was put in 1,000 ml of ice water, followed by stirring to precipitate a solid. The solid was collected by filtration and suspended in 350 ml of water, followed by stirring for 1 hour, and the suspension was subjected to filtration, and then the obtained solid was suspended in 50 ml of isopropyl ether and 350 ml of water in this order for purification, followed by drying to obtain 2.15 g (yield: 30%) of the following compound (11).

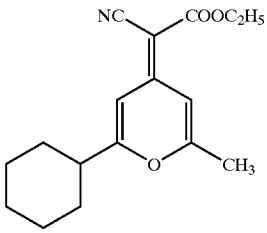

0.4 g of the obtained compound (11) was dissolved in 6 ml of n-butylamine, followed by reflux in an oil bath for 1.5 hours with stirring. After cooling, 25 ml of water was added to the reaction solution, followed by stirring for 30 minutes to precipitate a solid. The solid was collected by filtration, then adequately washed with water and dried to obtain 0.36 g (yield: 76%) of the compound (86).

The mass spectrum of this compound was measured, whereupon a peak of m/z342(M+) which agreed with that of an aimed compound was observed.

Further, this compound had a λmax in chloroform of 375 nm and a molar absorptivity of $4.2 \times 10^4$.

(b) Recording Medium Example

The above compound (86) was dissolved in octafluoropentanol and adjusted to 1.0 wt %, and this solution was subjected to filtration to obtain a dissolved solution, which was dropped on a substrate made of an injection-molded polycarbonate resin having a diameter of 120 mm and a thickness of 1.2 mm, and coated by a spinner method, followed by drying at 100° C. for 30 minutes. This coating film had maximum absorption wavelengths (λmax) of 374 nm and 360.5 nm (the peak had two tops).

Evaluation of Optical Recording Medium

On the coating film prepared in Example 10, Ag or the like may be formed by a sputtering method or the like as the case requires to form a reflective layer, and a ultraviolet-curing resin may further be coated by spin coating or the like and cured by irradiation with UV to form a protective layer, thereby to form an optical recording medium. It is evident from the value of λmax of the coating film that on this optical recording medium, recording/readout by semiconductor laser with a center wavelength of 405 nm for example can be carried out.

Example 11 Compound (69)

(a) Preparation Example 1.5 g (6.8 mmol) of the above compound (2) and 20 ml of cyclopentylamine were subjected to reflux in an oil bath for 1.5 hours with stirring. Then, the reaction solution was cooled, mixed with 250 ml of water and stirred, and left to stand overnight to precipitate crystals, which were collected by filtration.

The collected substance was suspended in 250 ml of water and stirred for one hour, followed by filtration, and the collected substance was suspended in 40 ml of diisopropyl ether and stirred for one hour, followed by filtration. The collected substance was dried under vacuum to obtain 0.92 g (yield: 47%) of the compound (69).

The mass spectrum of this compound was measured, whereupon a peak of m/z286(M+) which agreed with to that of an aimed compound was observed.

Further, 1H-NMR (CDCl$_3$ (δ=ppm) 270 MHz) was measured, whereupon peaks of 1.33(3H, t, —OCH$_2$CH$_3$), 1.79–2.20 (8H, m, cyclopetyl-H), 2.52(6H, pyridone-2,6-CH$_3$, d), 4.22(2H, q, —OCH$_2$—), 4.92(1H, m, N—CH), 6.85(1H, d, pyridone-H) and 8.22(1H, d, pyridone-H) were observed.

This compound had a maximum absorption wavelength (λmax) in chloroform of 376.5 nm and a molar absorptivity of $4.0 \times 10^4$.

b) Recording Medium Example

The compound (69) was dissolved in octafluoropentanol and adjusted to 1.0 wt %, and this solution was subjected to filtration to obtain a dissolved solution, which was dropped on a substrate made of an injection-molded polycarbonate resin having a diameter of 120 mm and a thickness of 1.2 mm, and coated by a spinner method, followed by drying at 100° C. for 30 minutes. This coating film had maximum absorption wavelengths (λmax) of 376 nm and 362.5 (s) nm.

(c) Preparation Example of Disc for Evaluation

The above compound (69) was dissolved in octafluoropentanol and adjusted to 0.6 wt %. This solution was subjected to filtration to obtain a dissolved solution, which was dropped on a substrate made of an injection-molded polycarbonate resin having a diameter of 120 mm and a thickness of 0.6 mm, and having grooves with a track pitch of 0.74 μm, a groove width of 0.3 μm and a groove depth of 90 nm, and coated by a spinner method. The coating was carried out by increasing the number of rotations from 600 rpm to 4,900 rpm over a period of 25 seconds and keeping the number of rotations at 4,900 rpm for 5 seconds. Then, drying was carried out at 100° C. for 30 minutes to obtain a recording layer. Then, silver was formed in a thickness of 100 nm by a sputtering method to form a reflective layer. Then, a protective coat agent comprising a UV curing resin was coated by a spinner method, followed by irradiation with UV light to form a protective layer having a thickness of 5 μm. Further, a substrate made of polycarbonate having a thickness of 0.6 mm was attached to the protective layer side by using a delayed-curing type adhesive to prepare a disc for evaluation.

(d) Recording Example

While rotating the disc for evaluation at a linear velocity of 5.7 m/sec, single-frequency signals of 8T mark/8T space were recorded on the grooves with a laser beam having a wavelength of 405 nm (numerical aperture NA of an object lens: 0.65). Here, T is a reference clock period corresponding to a frequency of 66 MHz. The recording pulse strategy was in accordance with DVD-R Ver.2 specification, and the number of divided pulses was such that the leading recording pulse width was 2T, the following recording pulse width was 0.6 T, the bias power was 0.2 mW, the readout power was 0.2 mW, and the recording power was variable, where the mark length was nT (n–2). As a result, recording could be carried out at a recording power of at least 3 mW, and signals with a modulated amplitude of 20% could be recorded at 8 mW. The modulated amplitude is considered to be higher by optimizing recording conditions such as pulse strategy.

Example 12 Compound (103)

(a) Preparation Example

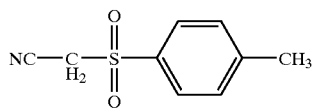

(13)

0.93 g (7.5 mmol) of 2,6-dimethyl-γ-pyrone and 1.46 g (7.5 mmol) of p-toluenesulfonyl acetonitrile of the above structural formula (13) were dissolved in 30 ml of acetic anhydride with stirring, followed by reflux in an oil bath for 13.5 hours. The obtained reaction solution was cooled and then mixed with 250 ml of ice water, followed by stirring to precipitate a solid. Then, the solid was collected by filtration, adequately washed with water and dried under vacuum to obtain 1.6 g (yield: 70.8%) of the compound (3).

0.3 g of this compound was dissolved in 6 ml of 4-aminomorpholine and heated in an oil bath at 150° C. for one and a half hour with stirring. After the reaction solution was cooled, 30 ml of water was added thereto, followed by stirring to precipitate a solid. Then, the solid was collected by filtration from the reaction solution and adequately washed with water and isopropyl ether to obtain 0.17 g (yield: 45.6%) of the compound (103).

The mass spectrum of this compound was measured, whereupon a peak of m/z385(M+) which agreed with that of an aimed compound was observed. Further, 1H-NMR (CDCl$_3$ (67=ppm) 270 MHz) was measured, whereupon peaks of 2.41(3H, s, Ph—CH$_3$), 2.5(6H, d, pyridone-2,6-CH$_3$), 3.32(4H, t, —NCH$_2$—), 3.84(4H, t, —OCH$_2$), 6.61 (1H, d, pyridone-H), 7.29(2H, d, Tol-3,5-H), 7.46(1H, d, pyridone-H), 7.85(2H, d, Tol-2,5-H) were observed.

This compound had a λmax in chloroform of 369.5 nm and a molar absorptivity of 3.7×10$^4$.

b) Recording Medium Example

The compound (103) was dissolved in octafluoropentanol and adjusted to 1.0 wt %, and this solution was subjected to filtration to obtain a dissolved solution, which was dropped on a substrate made of an injection-molded polycarbonate resin having a diameter of 120 mm and a thickness of 1.2 mm, and coated by a spinner method, followed by drying at 100° C. for 30 minutes. This coating film had maximum absorption wavelengths (λmax) of 357 nm and 372.5 (s) nm.
Evaluation of Optical Recording Medium On the coating film prepared in Example 12, Ag or the like may be formed by a sputtering method or the like as the case requires to form a reflective layer, and a ultraviolet-curing resin may further be coated by spin coating or the like and cured by irradiation with UV to form a protective layer, thereby to form an optical recording medium. It is evident from the value of λmax of the coating film that on this optical recording medium, recording/readout by semiconductor laser with a center wavelength of 405 nm for example can be carried out.

Examples 13 to 35

In the same method as in the above synthesis method, the compounds (68), (70) to (85) and (87) to (92) were synthesized, coating films were formed in the same manner as in Examples, and the absorption spectrum of each of the coating films was measured. The maximum absorption wavelength in a solution and the molar absorptivity of each of these compounds and the maximum absorption wavelength of each of the coating films are shown in Table 1.
Evaluation of Optical Recording Medium On each of the coating films prepared in Examples 13 to 35, Ag or the like may be formed by a sputtering method or the like as the case requires to form a reflective layer, and a ultraviolet-curing resin may further be coated by spin coating or the like and cured by irradiation with UV to form a protective layer, thereby to form an optical recording medium. It is evident from the value of λmax of the coating film that on this optical recording medium, recording/readout by semiconductor laser with a center wavelength of 405 nm for example can be carried out.

TABLE 1

| Ex. | Compound | Maximum absorption wavelength in solution (solvent) | Molar absorptivity (×10,000) | Coating solvent | Maximum absorption wavelength of coating film |
|---|---|---|---|---|---|
| 1 | (1) | 402.5 nm (chloroform) | 2.4 | Methyl lactate | 395.5 nm |
| 2 | (51) | 357.5 nm (chloroform) | 2.8 | Octafluoropentanol | 344 nm |
| 3 | (2) | 351 nm (chloroform) | 2.5 | 3-hydroxy-3-methyl-2-butanone | 352.5 nm |
| 4 | (31) | 375.5 nm (chloroform) | 3.6 | Octafluoropentanol | 373.5 nm |
| 5 | (9) | 388 nm (chloroform) | 2.1 | Octafluoropentanol | 388 nm |
| 6 | (3) | 346.5 nm (chloroform) | 1.7 | Octafluoropentanol | 346.5 nm |

TABLE 1-continued

| Ex. | Compound | Maximum absorption wavelength in solution (solvent) | Molar absorptivity (×10,000) | Coating solvent | Maximum absorption wavelength of coating film |
|---|---|---|---|---|---|
| 7 | (32) | 367 nm (chloroform) | 4.2 | Octafluoropentanol | 358 nm |
| 8 | (55) | 386.5 nm (chloroform) | 4.0 | 3-hydroxy-3-methyl-2-butanone | 381.5 nm |
| 9 | (59) | 380 nm (chloroform) | 3.6 | Methyl lactate | 377 nm |
| 10 | (86) | 375 nm (chloroform) | 4.2 | Octafluoropentanol | 374, 360.5 nm |
| 11 | (69) | 376.5 nm (chloroform) | 4.0 | Octafluoropentanol | 376, 362.5 nm |
| 12 | (103) | 369.5 nm (chloroform) | 3.7 | Octafluoropentanol | 357, 372.5 (s) nm |
| 13 | (68) | 369.5 nm (chloroform) | 1.9 | Octafluoropentanol | 370.5 nm |
| 14 | (70) | 376.5 nm (chloroform) | 4.2 | Octafluoropentanol | 375.5, 361 nm |
| 15 | (71) | 375 nm (chloroform) | 4.0 | Octafluoropentanol | 373, 359 nm |
| 16 | (72) | 375.5 nm (chloroform) | 4.1 | Octafluoropentanol | 318 nm |
| 17 | (73) | 375 nm (chloroform) | 4.5 | Octafluoropentanol | 316 nm |
| 18 | (74) | 378.5 nm (chloroform) | 3.9 | Octafluoropentanol | 315 nm |
| 19 | (75) | 375.5 nm (chloroform) | 3.6 | Octafluoropentanol | 339.5 nm |
| 20 | (76) | 378 nm (chloroform) | 3.9 | Octafluoropentanol | 315.5 nm |
| 21 | (77) | 351.5 nm (chloroform) | 2.3 | Octafluoropentanol | 351 nm |
| 22 | (78) | 375 nm (chloroform) | 3.8 | Octafluoropentanol | 374, 363.5 (s) nm |
| 23 | (79) | 378.5 nm (chloroform) | 3.8 | Octafluoropentanol | 314.5 nm |
| 24 | (80) | 375 nm (chloroform) | 3.8 | Octafluoropentanol | 365.5 nm |
| 25 | (81) | 351 nm (chloroform) | 2.0 | Octafluoropentanol | 350.5 nm |
| 26 | (82) | 375.5 nm (chloroform) | 4.5 | Octafluoropentanol | 374.5, 361 nm |
| 27 | (83) | 378 nm (chloroform) | 4.2 | 3-hydroxy-3-methyl-2-butanone | 315 nm |
| 28 | (84) | 472 nm (chloroform) | 7.0 | Octafluoropentanol | 478, 450.5 nm |
| 29 | (85) | 353 nm (chloroform) | 2.2 | Octafluoropentanol | 353.5 nm |
| 30 | (87) | 375.5 nm (chloroform) | 4.2 | Octafluoropentanol | 375, 362.5 (s) nm |
| 31 | (88) | 351.5 nm (chloroform) | 2.8 | Octafluoropentanol | 351 nm |
| 32 | (89) | 376.5 nm (chloroform) | 4.5 | Octafluoropentanol | 360, 376 (s) nm |
| 33 | (90) | 375.5 nm (chloroform) | 4.6 | Octafluoropentanol | 356.5, 371.5 (s) nm |
| 34 | (91) | 373.5 nm (chloroform) | 4.2 | Octafluoropentanol | 373, 360.5 nm |
| 35 | (92) | 379.5 nm (chloroform) | 4.2 | Octafluoropentanol | 357 nm |

Comparative Example 1

(a) Preparation Example 5 mmol of 4-dimethylaminobenzaldehyde and 5 mmol of the above ethyl cyanoacetate were dissolved in 5 ml of 1,4-dioxane, 0.1 ml of piperidine was dropped thereto, followed by stirring at room temperature for 2 hours, and the solution was left to stand overnight, and the precipitated crystals were collected by filtration and washed with methanol to obtain the following compound ⑫.

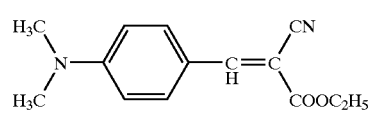

This compound had a λmax in chloroform of 422 nm and a molar absorptivity of $4.8 \times 10^4$.

(b) Recording Medium Example

The above compound ⑫ was dissolved in octafluoropentanol and adjusted to 1.0 wt %. This solution was subjected to filtration to obtain a dissolved solution, which was dropped on a substrate made of an injection-molded polycarbonate resin having a diameter of 120 mm and a thickness of 1.2 mm, and coated by a spinner method, however, crystallization took place on the disk surface immediately after completion of the coating, and no favorable coating film was formed.

Example 35
Evaluation of Storage Stability of Coating Film

In order to evaluate storage stability of the coating film, the following storage stability test was carried out with respect to the compounds (31), (86), (69), (71), (78) and (82) (corresponding to Examples 4, 10, 11, 15, 22 and 26) among the compounds prepared in Examples 1 to 35. These compounds were selected as they have a spectrum considered to be suitable for recording by blue laser with a wavelength of 405 nm.

The substrate coated with each of the above compounds was left to stand in a constant temperature and humidity bath at 85° C. at a relative humidity of 85% for 200 hours. After this storage stability test, the absorption spectrum of each of the coating films was measured again, and comparison of the absorption intensity before and after the test was carried out. The comparison of the absorption intensity was carried out at a wavelength of λmax of the coating film before the test, and the storage stability (%) was obtained as [(absorption intensity at the absorption spectrum after the test)/(absorption intensity at the absorption spectrum before the test)]×100.

The results are shown in Table 2. These dyes can be considered to be compounds having a high storage stability, since an absorption intensity of at least 89% of that before the test was maintained, and substantially no change in the shape of the absorption spectrum was observed.

Figure 7:
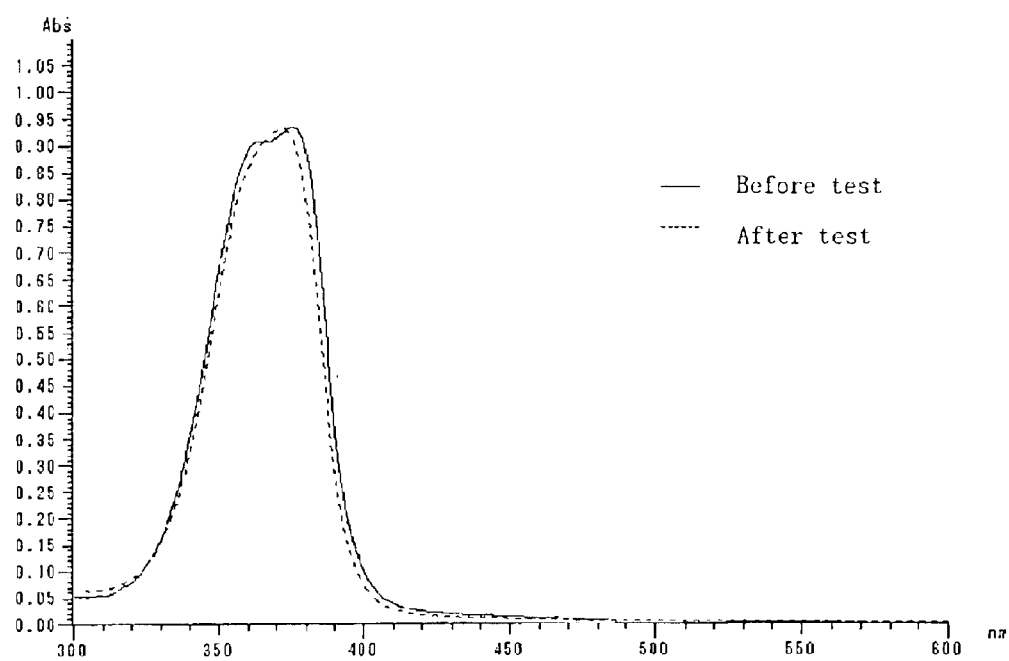
FIG. 7 illustrates absorption spectra of a coating film of a dye of the compound (31) in Example 36 before and after the storage stability test.

The absorption spectra of the coating film of the compound (31) before and after the storage stability test are shown in FIG. 7. The spectrum before the test is indicated by a solid line and the spectrum after the test is indicated by a broken line.

TABLE 2

| Ex. | Compound | Storage stability |
|---|---|---|
| 4 | (31) | 97.6% |
| 10 | (86) | 94.6% |
| 11 | (69) | 98.2% |
| 15 | (71) | 89.3% |
| 22 | (78) | 96.8% |
| 26 | (82) | 96.0% |

With a solution containing the compound of the present invention, a coating film having an absorption suitable for recording/readout by a laser beam having a short wavelength can be formed, and the solution is excellent in film forming properties, and further, the coating film is excellent in storage stability, and accordingly a recording medium having a recording layer comprising the compound of the present invention is useful as an optical recording medium for recording/readout corresponding to short wavelength laser.

Accordingly, by recording information on the optical recording medium of the present invention by using a laser beam having a short wavelength of from 350 to 530 nm, recording/readout of a large amount of information at a higher density can be carried out.

The entire disclosure of Japanese Patent Application No. 2001-372199 filed on Dec. 6, 2001 including specification, claims, drawings and summary is incorporated herein by reference in its entirety.

What is claimed is:

1. An optical recording medium comprising a substrate and a recording layer on which recording and readout of information can be carried out by laser, formed on the substrate, wherein the recording layer contains a compound of the following formula [I]:

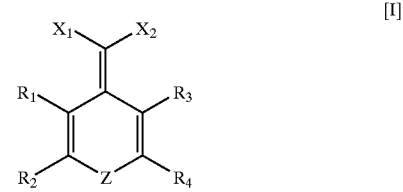

wherein each of $R_1$ to $R_4$ is a hydrogen atom or an optional substituent, provided that $R_1$ and $R_2$, and $R_3$ and $R_4$, may be bonded to form a hydrocarbon ring or a heterocyclic ring structure, and the hydrocarbon ring and the heterocyclic ring may have a substituent;

$X_1$ is an electro-withdrawing group, and $X_2$ is a hydrogen atom or —Q—Y (wherein Q is a direct bonding, a $C_{1-2}$ alkylene group, an arylene group or a heteroarylene group, and Y is an electro-withdrawing group, provided that the alkylene group, the arylene group and the heteroarylene group may have an optional substituent in addition to Y); and Z is —O—, —S—, —SO$_2$— or —NR$_5$— [wherein $R_5$ is a hydrogen atom, a hydrocarbon group which may be substituted, a heterocyclic group which may be substituted, a cyano group, a hydroxyl group, an amino group represented by —NR$_6$R$_7$ (wherein each of $R_6$ and $R_7$ which are independent of each other, is a hydrogen atom, a hydrocarbon group which may be substituted, a heterocyclic group which may be substituted or —COR$_8$ <wherein $R_8$ is a hydrocarbon group which may be substituted or a heterocyclic group which may be substituted>) or —COR$_9$ (wherein $R_9$ is a hydrocarbon group which may be substituted or a heterocyclic group which may be substituted), provided that when $R_5$ is a hydrocarbon group, it may be bonded with $R_2$ or $R_4$ to form a cyclic structure].

2. The optical recording medium according to claim 1, wherein in the formula [I], each of $X_1$ and Y which are independent of each other, is an alkyl group substituted with halogen, a cyano group, a nitro group, —CO—R$_{10}$ (wherein $R_{10}$ is a hydrocarbon group which may be substituted or a heterocyclic group which may be substituted), —COOR$_{11}$ (wherein $R_{11}$ is a hydrogen atom, a hydrocarbon group which may be substituted or a heterocyclic group which may be substituted), —CONR$_{12}$R$_{13}$ [wherein each of $R_{12}$ and $R_{13}$ which are independent of each other, is a hydrogen atom, a hydrocarbon group which may be substituted, a heterocyclic group which may be substituted, an amino group which may be substituted, an acylamino group which may be substituted, a carbamate group which may be substituted, —COR$_{14}$ or —COOR$_{15}$ (wherein each of $R_{14}$ and $R_{15}$ is an optional substituent)], —SOR$_{16}$ (wherein $R_{16}$ is a hydrocarbon group which may be substituted or a heterocyclic group which may be substituted), —SO$_2$R$_{17}$ (wherein $R_{17}$ is a hydrocarbon group which may be substituted or a heterocyclic group which may be substituted) or —SO$_2$NR$_{18}$R$_{19}$ (wherein each of R$_{18}$ and R$_{19}$ which are independent of each other, is a hydrogen atom, a hydrocarbon group which may be substituted or a heterocyclic group which may be substituted); and X$_2$ is a hydrogen atom or —Q—Y (wherein Q is a direct bonding, a phenylene group or a 5- or 6-membered heteroarylene group, provided that the phenylene group and the 5- or 6-membered heteroarylene group may have a substituent in addition to Y.

3. The optical recording medium according to claim 1, wherein in the formula [I], each of R$_1$ to R$_4$ which are independent of one another, is a C$_{1-18}$ linear or branched alkyl group which may be substituted, a C$_{3-18}$ cyclic alkyl group which may be substituted, a C$_{2-18}$ linear or branched alkenyl group which may be substituted, a C$_{3-18}$ cyclic alkenyl group which may be substituted, a heterocyclic group which may be substituted, a C$_{6-18}$ aryl group which may be substituted, a C$_{7-24}$ aralkyl group which may be substituted, a C$_{1-18}$ linear or branched alkoxy group which may be substituted, a C$_{3-18}$ linear or branched alkenyloxy group which may be substituted, a C$_{1-18}$ linear or branched alkylthio group which may be substituted, a halogen atom, a nitro group, a nitroso group, a cyano group, an isocyano group, a cyanato group, an isocyanato group, a thiocyanato group, an isothiocyanato group, a mercapto group, a hydroxyl group, a hydroxyamino group, a sulfonic acid group, a formyl group, a carboxyl group, an acyl group represented by —COR$_{20}$, an amino group represented by —NR$_{21}$R$_{22}$, an acylamino group represented by —NHCOR$_{23}$, a carbamate group represented by —NHCOOR$_{24}$, a carboxylate group represented by —COOR$_{25}$, an acyloxy group represented by —OCOR$_{26}$, a carbamoyl group represented by —CONR$_{27}$R$_{28}$, a sulfonyl group represented by —SO$_2$R$_{29}$, a sulfamoyl group represented by —SO$_2$NR$_{30}$R$_{31}$, a sulfonate group represented by —SO$_3$R$_{32}$, a sulfonamide group represented by —NHSO$_2$R$_{33}$ or a sulfinyl group represented by —SOR$_{34}$ (wherein each of R$_{20}$, R$_{23}$, R$_{24}$, R$_{25}$, R$_{26}$, R$_{29}$, R$_{32}$, R$_{33}$ and R$_{34}$ is a hydrocarbon group which may be substituted or a heterocyclic group which may be substituted, and each of R$_{21}$, R$_{22}$, R$_{27}$, R$_{28}$, R$_{30}$ and R$_{31}$ is a hydrogen atom, a hydrocarbon group which may be substituted or a heterocyclic group which may be substituted), provided that R$_1$ and R$_2$, and R$_3$ and R$_4$, may independently be bonded to form a 5- to 7-membered hydrocarbon ring which may be substituted or a 5- or 6-membered heterocyclic ring which may be substituted.

4. The optical recording medium according to claim 1, wherein in the formula [I], each of R$_1$ to R$_4$ which are independent of one another, is a C$_{1-12}$ linear or branched alkyl group which may be substituted, a C$_{3-12}$ cyclic alkyl group which may be substituted, a C$_{2-12}$ linear or branched alkenyl group which may be substituted, a 5- or 6-membered saturated heterocyclic group, a 5- or 6-membered monocyclic or condensed bicyclic heteroaromatic ring group, a C$_{6-18}$ aryl group which may be substituted, a C$_{7-20}$ aralkyl group which may be substituted, a C$_{1-12}$ linear or branched alkoxy group which may be substituted, a C$_{1-12}$ linear or branched alkylthio group which may be substituted, a halogen atom, a nitro group, a cyano group, a mercapto group, a hydroxyl group, an acyl group represented by —COR$_{20}$, an amino group represented by —NR$_{21}$R$_{22}$, an acylamino group represented by —NHCOR$_{23}$, a carbamate group represented by —NHCOOR$_{24}$, a carboxylate group represented by —COOR$_{25}$, an acyloxy group represented by —OCOR$_{26}$, a carbamoyl group represented by —CONR$_{27}$R$_{28}$ or a sulfonamide group represented by —NHSO$_2$R$_{33}$ (wherein each of R$_{20}$, R$_{23}$, R$_{24}$, R$_{25}$, R$_{26}$, R$_{33}$, R$_{21}$, R$_{22}$, R$_{27}$ and R$_{28}$ is as defined in claim 3), provided that R$_1$ and R$_2$, and R$_3$ and R$_4$, may independently be bonded to form a 5- to 7-membered hydrocarbon ring which may be substituted or a 5- or 6-membered heterocyclic ring which may be substituted.

5. The optical recording medium according to claim 1, wherein in the formula [I], Z is —O—, —S—, —SO$_2$— or —NR$_5$—[wherein R$_5$ is a hydrogen atom, a C$_{1-18}$ linear or branched alkyl group which may be substituted, a C$_{3-18}$ cyclic alkyl group which may be substituted, a C$_{6-18}$ aryl group which may be substituted, a C$_{7-20}$ aralkyl group which may be substituted, a 5- or 6-membered saturated heterocyclic group which may be substituted or an amino group represented by —NR$_6$R$_7$ (wherein each of R$_6$ and R$_7$ which are independent of each other, is a hydrogen atom, a C$_{1-18}$ linear or branched alkyl group which may be substituted, a C$_{6-18}$ aryl group which may be substituted, a C$_{7-20}$ aralkyl group which may be substituted or a heterocyclic group which may be substituted)], provided that when R$_5$ is not a hydrogen atom nor an amino group, it may be bonded with R$_2$ or R$_4$ to form a cyclic structure.

6. An optical recording medium comprising a substrate and a recording layer on which recording and readout of information can be carried out by laser, formed on the substrate, wherein the recording layer contains a compound of the following formula [II]:

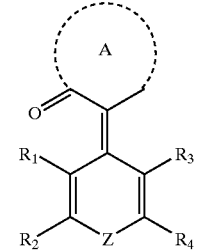

wherein each of R$_1$ to R$_4$ is a hydrogen atom or an optional substituent, provided that R$_1$ and R$_2$, and R$_3$ and R$_4$, may be bonded to form a hydrocarbon ring or a heterocyclic ring structure, and the hydrocarbon ring and the heterocyclic ring may have a substituent;

the ring A is a carbocyclic ketone ring or a heterocyclic ketone ring which may have a substituent, formed together with C=O; and Z is —O—, —S—, —SO$_2$— or —NR$_5$— [wherein R$_5$ is a hydrogen atom, a hydrocarbon group which may be substituted, a heterocyclic group which may be substituted, a cyano group, a hydroxyl group, an amino group represented by —NR$_6$R$_7$ (wherein each of R$_6$ and R$_7$ which are independent of each other, is a hydrogen atom, a hydrocarbon group which may be substituted, a heterocyclic group which may be substituted or —COR$_8$ <wherein R$_8$ is a hydrocarbon group which may be substituted or a heterocyclic group which may be substituted>) or —COR$_9$ (wherein R$_9$ is a hydrocarbon group which may be substituted or a heterocyclic group which may be substituted), provided that when R$_5$ is a hydrocarbon group, it may be bonded with R$_2$ or R$_4$ to form a cyclic structure].

7. The optical recording medium according to claim 6, wherein in the formula [II], the ring A is a 5- or 6-membered carbocyclic ketone ring which may be substituted or a 5- or 6-membered heterocyclic ketone ring which may be substituted.

8. The optical recording medium according to claim 6, wherein in the formula [II], each of $R_1$ to $R_4$ which are independent of one another, is a $C_{1-18}$ linear or branched alkyl group which may be substituted, a $C_{3-18}$ cyclic alkyl group which may be substituted, a $C_{2-18}$ linear or branched alkenyl group which may be substituted, a $C_{3-18}$ cyclic alkenyl group which may be substituted, a heterocyclic group which may be substituted, a $C_{6-18}$ aryl group which may be substituted, a $C_{7-24}$ aralkyl group which may be substituted, a $C_{1-18}$ linear or branched alkoxy group which may be substituted, a $C_{3-18}$ linear or branched alkenyloxy group which may be substituted, a $C_{1-18}$ linear or branched alkylthio group which may be substituted, a halogen atom, a nitro group, a nitroso group, a cyano group, an isocyano group, a cyanato group, an isocyanato group, a thiocyanato group, an isothiocyanato group, a mercapto group, a hydroxyl group, a hydroxyamino group, a sulfonic acid group, a formyl group, a carboxyl group, an acyl group represented by —$COR_{20}$, an amino group represented by —$NR_{21}R_{22}$, an acylamino group represented by —$NHCOR_{23}$, a carbamate group represented by —$NHCOOR_{24}$, a carboxylate group represented by —$COOR_{25}$, an acyloxy group represented by —$OCOR_{26}$, a carbamoyl group represented by —$CONR_{27}R_{28}$, a sulfonyl group represented by —$SO_2R_{29}$, a sulfamoyl group represented by —$SO_2NR_{30}R_{31}$, a sulfonate group represented by —$SO_3R_{32}$, a sulfonamide group represented by —$NHSO_2R_{33}$ or a sulfinyl group represented by —$SOR_{34}$ (wherein each of $R_{20}$, $R_{23}$, $R_{24}$, $R_{25}$, $R_{26}$, $R_{29}$, $R_{32}$, $R_{33}$ and $R_{34}$ is a hydrocarbon group which may be substituted or a heterocyclic group which may be substituted, and each of $R_{21}$, $R_{22}$, $R_{27}$, $R_{28}$, $R_{30}$ and $R_{31}$ is a hydrogen atom, a hydrocarbon group which may be substituted or a heterocyclic group which may be substituted), provided that $R_1$ and $R_2$, and $R_3$ and $R_4$, may independently be bonded to form a 5- to 7-membered hydrocarbon ring which may be substituted or a 5- or 6-membered heterocyclic ring which may be substituted.

9. The optical recording medium according to claim 6, wherein in the formula [II], each of $R_1$ to $R_4$ which are independent of one another, is a $C_{1-12}$ linear or branched alkyl group which may be substituted, a $C_{3-12}$ cyclic alkyl group which may be substituted, a $C_{2-12}$ linear or branched alkenyl group which may be substituted, a 5- or 6-membered saturated heterocyclic group, a 5- or 6-membered monocyclic or condensed bicyclicheteroaromatic ring group, a $C_{6-18}$ aryl group which may be substituted, a $C_{7-20}$ aralkyl group which may be substituted, a $C_{1-12}$ linear or branched alkoxy group which may be substituted, a $C_{1-12}$ linear or branched alkylthio group which may be substituted, a halogen atom, a nitro group, a cyano group, a mercapto group, a hydroxyl group, an acyl group represented by —$COR_{20}$, an amino group represented by —$NR_{21}R_{22}$, an acylamino group represented by —$NHCOR_{23}$, a carbamate group represented by —$NHCOOR_{24}$, a carboxylate group represented by —$COOR_{25}$, an acyloxy group represented by —$OCOR_{26}$, a carbamoyl group represented by —$CONR_{27}R_{28}$ or a sulfonamide group represented by —$NHSO_2R_{33}$ (wherein each of $R_{20}$, $R_{23}$, $R_{24}$, $R_{25}$, $R_{26}$, $R_{33}$, $R_{21}$, $R_{22}$, $R_{27}$ and $R_{28}$ is as defined in claim 8), provided that $R_1$ and $R_2$, and $R_3$ and $R_4$, may independently be bonded to form a 5- to 7-membered hydrocarbon ring which may be substituted or a 5- or 6-membered heterocyclic ring which may be substituted.

10. The optical recording medium according to claim 6, wherein in the formula [II], Z is —O—, —S—, —$SO_2$— or —$NR_5$— [wherein $R_5$ is a hydrogen atom, a $C_{1-18}$ linear or branched alkyl group which may be substituted, a $C_{3-18}$ cyclic alkyl group which may be substituted, a $C_{6-18}$ aryl group which may be substituted, a $C_{7-20}$ aralkyl group which may be substituted, a 5- or 6-membered saturated heterocyclic group which may be substituted or an amino group represented by —$NR_6R_7$ (wherein each of $R_6$ and $R_7$ which are independent of each other, is a hydrogen atom, a $C_{1-18}$ linear or branched alkyl group which may be substituted, a $C_{6-18}$ aryl group which may be substituted, a $C_{7-20}$ aralkyl group which may be substituted or a heterocyclic group which may be substituted)], provided that when $R_5$ is not a hydrogen atom nor an amino group, it may be bonded with $R_2$ or $R_4$ to form a cyclic structure.

11. A novel compound of the following formula [I']:

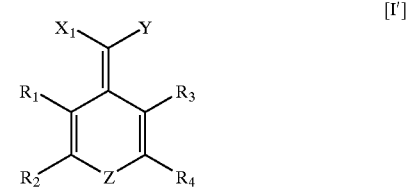

wherein each of $R_1$ to $R_4$ is a hydrogen atom or an optional substituent, provided that $R_1$ and $R_2$, and $R_3$ and $R_4$, may independently be bonded to form a hydrocarbon ring or a heterocyclic ring structure, and the hydrocarbon ring and the heterocyclic ring may have a substituent; each of $X_1$ and Y is an electro-withdrawing group, provided that one of $X_1$ and Y is a cyano group, and the other is —$COOR_{11}$ (wherein $R_{11}$ is a hydrogen atom, a hydrocarbon group which may be substituted or a heterocyclic group which may be substituted) or —$SO_2R_{17}$ (wherein $R_{17}$ is a hydrocarbon group which may be substituted or a heterocyclic group which may be substituted); and Z is —$NR_5$— (wherein in a case where one of $X_1$ and Y is —$COOR_{11}$, $R_5$ is a $C_{3-18}$ branched alkyl group which may be substituted, a $C_{3-18}$ cyclic alkyl group which may be substituted or a 5- or 6-membered saturated heterocyclic group which may be substituted, and in a case where one of $X_1$ and Y is —$SO_2R_{17}$, $R_5$ is a $C_{1-18}$ linear or branched alkyl group which may be substituted, a $C_{3-18}$ cyclic alkyl group which may be substituted or a 5- or 6-membered saturated heterocyclic group which may be substituted).

12. An optical recording method, which comprises recording information on the optical recording medium as defined in claim 1 or 6 by using a laser beam having a wavelength of from 350 to 530 nm.

* * * * *